United States Patent [19]

Pincheira Alvarez et al.

[11] Patent Number: 5,527,382
[45] Date of Patent: *Jun. 18, 1996

[54] HYDROMETALLURGICAL PROCESS FOR THE TREATMENT OF COPPER BEARING ORE

[75] Inventors: Aliro Teodoro Nelson Pincheira Alvarez; Andres Antonio Reghezza Insunza; Alberto Segundo Cruz Rivera, all of Chuquicamata, Chile

[73] Assignee: Corporacion Nacional Del Cobre De Chile, Santiago, Chile

[*] Notice: The term of this patent shall not extend beyond the expiration date of Pat. No. 5,356,457.

[21] Appl. No.: 323,182

[22] Filed: Oct. 14, 1994

Related U.S. Application Data

[63] Continuation of Ser. No. 990,163, Dec. 14, 1993, Pat. No. 5,356,457.

[30] Foreign Application Priority Data

Dec. 18, 1991 [CL] Chile ............................... 1268-91

[51] Int. Cl.⁶ ......................................................... C22B 3/08
[52] U.S. Cl. ................................ 75/712; 75/743; 205/583
[58] Field of Search ........................... 75/712, 710, 743; 204/108

[56] References Cited

U.S. PATENT DOCUMENTS 5,356,457  10/1994  Pincheira Alvarez et al. ........... 75/710

FOREIGN PATENT DOCUMENTS 30851  3/1979  Chile .
32025  1/1980  Chile .

Primary Examiner—Melvyn Andrews
Attorney, Agent, or Firm—Pennie & Edmonds

[57] ABSTRACT

A hydrometallurgical process for recovering copper from copper bearing ores or fractions, by a process of first wetting and sulfatizing the ore with controlled amounts of $H_2SO_4$ and water, followed by acid curing and repulping to sulfatize a substantial portion of the copper in the ore. Also, the fine and coarse fractions can be classified, followed by pile leaching the coarse fraction, preferably reusing the cycled $H_2SO_4$ solution obtained during the copper recovery process. Since the coarse fraction is classified from the fine fraction, the pile leaching process is performed at very high specific flows, which substantially reduces the leaching period as compared with that of conventional pile leaching.

25 Claims, 7 Drawing Sheets

HYDROMETALLURGICAL PROCESS FOR THE TREATMENT OF COPPER BEARING ORE

This is a continuation of application Ser. No. 07/990,163, filed Dec. 14, 1993, now U.S. Pat. No. 5,356,457.

BACKGROUND

The present invention relates to a novel process for treating copper ore to recover the copper therefrom.

In hydrometallurgical process for extracting metal, such as copper, from ore containing the same, it is desirous to extract as much metal as possible from a broad granulometric fraction of the ore. The most frequently employed conventional process, leaching for instance, consumes too much time due to the fact that the flow of leaching solution is too slow, and thus uneconomical. Moreover, the conventional process wastes a significant amount of energy and requires expensive and sophisticated equipment.

Leaching techniques are well known for extracting common metals. Commonly used leaching techniques include 1) in situ leaching, 2) dump leaching, 3) pile leaching, 4) pan leaching, and 5) agitation leaching.

In in situ leaching, a leaching solution is injected to the ore that has been fragmented by explosives in the mine itself. The leaching solution percolates by gravity from the surface to the bottom, which is recovered for conventional treatment to extract the desired metals. Although this process appears to be economical in that does not require transferring of the material extracted from the mine or additional stages of comminution, it is extraordinarily slow and the recovery range is low due to the relatively coarse grain size of the treated material. Depending upon the nature of the ore and the type of operation used, this process can only recover in the range of 50 to 60% for an incredibly long leaching period of 5 to 25 years.

Dump leaching is normally applied to low-grade sources which have previously been deposited at specific places, in particular for those types of assays (stint assays) which are not suitable for normal in-plant processing. For instance, dumps formed of spalls generated in normal processing as for example in the case of ores from Chuquicamata, where low-grade sulfides and spalls from leaching are generated in the respective pans of oxidized ores, may be leached by this technique. As in the case of in situ leaching, this process is extraordinarily slow, and depending upon the grain size, the nature of the material and the type of operation, it is possible to recover the desired mineral up to 60% for a leaching period of 1 to 30 years.

Pile leaching is frequently used because of its low investment costs. This type of leaching is very similar to in situ and dump leaching processes. In pile leaching, however, the source material must first be crushed to a grain size that is normally less than one inch. It is also possible to recover more than 60% of the metal by this process for a leaching period of several weeks to several months, depending upon the characteristics of the ore and the procedure used.

Pan leaching is a very old technology which has been in use in Chuquicamata since 1915. In this process, the source material having the grain size of over ⅜ inch ranging from 20 to 30% of the material is leached for a period of 5 to 10 days to recover 60 to 80% of the metal, depending upon the nature of the ore treated. This leaching process may be carried out in a flooded bed or by spraying the leaching solution.

Agitation leaching is also a very old technology that requires fine grinding of the ore. The large surface area of the ore exposed to the solvent makes it possible to obtain a leaching period that ranges; from only 2 to 24 hours, with a maximum recovery of close to 90%, depending upon the characteristics of the ore. Although this technique is the most efficient in terms of rapid recovery, it consumes too much energy and requires the greatest initial investment.

As may be generally noted, with the exception of agitated leaching, the conventional leaching processes exhibit a very slow kinetic flow of solution and consequently require very prolonged periods for recovery of the metals, so that this is further reflected in a high inventory of copper in the process.

Agitated leaching, apart from requiring fine grinding, in some cases demands a very prolonged leaching period, which results in a significant consumption of energy. In addition, for the recovery of dissolved copper in particular, it requires stages of alternate countercurrent washing and decantation, normally carried out in extremely large thickeners. Lastly, the washed pulps must be deposited in tailing tanks, which involves very high investments and significant losses of the aqueous resource contained in the discarded pulp.

Leaching by percolation following curing is disclosed in Chilean Patent No. 30,851 granted to Codelco-Chile. This patent discloses a process of inhibiting a solution of silica in the leaching of silicated copper ores by adding water to the ore at the rate of 3 to 10% by weight and another stage of addition of pure industrial $H_2SO_4$ at rates of 7 to 50 kg $H_2SO_4$/MT of ore. The product is then subjected to a holding period of up to 48 hours prior to leaching by percolation in pans. The object of this process is to render the silica insoluble. There is no disclosure in this patent of repulping, classification, filtration of the fine fraction from the pulp and secondary leaching in piles of the classified coarse fraction.

In the process disclosed in Chilean Patent No. 32,025, granted to Sociedad Minera Pudahuel, an ore which has been sufficiently preagglomerated in $H_2SO_4$ and water is leached in thin layers. This patent emphasizes the importance of obtaining a consistent agglomerated product to avoid attrition of the weight of the leaching solution. In comparisons, the present invention does not require agglomerating the fine material, but rather obtains a homogeneous wetting of the initial ore. Also, the present invention does not require leaching of the agglomerated product in piles of thin layers, but rather includes the processes of repulping, classification, filtration of the fine fraction and secondary leaching of the coarse fraction.

A variety of existing published sources, in agitation leaching of tailings used in Nchanga plant in Zambia, disclose processes which include the stages of repulping of tailings, thickening, agitated acid leaching, thickening and filtration. However, unlike the present invention, they do not disclose stages of preliminary wetting of the material with $H_2SO_4$ and water, nor do they disclose curing or holding periods. Moreover, they do not disclose stages of classification or secondary leaching in piles of preclassified coarse fractions.

SUMMARY OF THE PRESENT INVENTION

The present invention relates to a process for extracting copper from copper bearing ore, comprising the steps of substantially uniformly wetting a copper bearing ore with sulfuric acid and water in sufficient quantities and for a sufficient time to alter the surface characteristics of the ore by increasing its thickening and filtration properties and to sulfatize a significant portion of the copper therein and form a sulfatized ore; repulping the sulfatized ore with an aqueous solution for a sufficient-time to extract a substantial portion of the sulfatized copper therefrom in a solution; and recovering copper from the extracted sulfatized copper solution.

In this process, the copper bearing ore may have a typical grain size ranging between that resulting from crushing and that resulting from fine grinding. The amount of sulfuric acid to be used is between about 5 and 500 kg/MT and preferably between about 15 and 60 kg/MT, while the amount of water to be used ranges from 0 to about 250 kg/MT, and preferably between about 40 and 120 kg/MT. It is convenient to utilize a concentrated $H_2SO_4$ solution as the source of sulfuric acid, with the water being plant water, refined process solution, or discarded electrolyte obtained from a electrolytic copper extracting process.

To assist in the sulfatizing of the copper in the ore, an oxidizing agent may be introduced into the copper bearing ore in the wetting stage in an amount sufficient to help oxidize copper sulfides. Also, the wetting step is followed by an aging step which generally takes place over a period of time between about 5 minutes and one year, while the repulping step has a residence time ranging from about 5 minutes to about 24 hours, and preferably is about 10 minutes or less.

After extracting the copper in solution, it may be recovered by a conventional solvent extraction-electrowinning process, and refined solvent extraction solution may be recycled for use as a supply of plant water.

The process may also comprise the steps of classifying the sulfatized copper ore into coarse and fine fractions and collecting the coarse fraction; pile leaching the coarse fraction with sulfuric acid and water to sulfatize a significant portion of the copper therein and form a sulfatized ore; and extracting a substantial portion of the sulfatized copper from the ore in a solution. Here, the pile leaching of the coarse fraction is carried out with a concentrated sulfuric acid solution at a flow rate of between about 2 and 500 liters/hour per square meter of ore. For efficiency, the percolated sulfuric acid solution from the pile leaching of the coarse fraction may be recycled to the pulping step.

In this embodiment, copper is recovered from the extracted sulfatized copper solution obtained from the pile leaching step directly, or it is combined with the extracted sulfatized copper solution obtained from the repulping step before recovering copper therefrom. The ore may be classified using a screen having apertures ranging from 200 Tyler sieve mesh to about 25 mm, and preferably ranging from about 2 to about 3 mm.

Also, this process may further comprise collecting the fine fraction; thickening the fine fraction; and countercurrently washing the thickened fine fraction to extract the sulfatized copper therefrom. Here, a flocculent may be added to the fine fraction prior to thickening in an amount of between about 5 and 500 grams per ton, and preferably between about 40 and 150 grams per ton. Thus, when the copper is recovered by a solvent extraction-electrowinning process, the percolated sulfuric acid solution from the pile leaching of the coarse fraction may be mixed with the solution coming from the fine fraction thickening and washing step; and the mixture can be recycled to the solvent extraction-electrowinning process.

BRIEF DESCRIPTION OF THE DRAWINGS

The specific features, aspects, and advantages of the present invention will become better understood with regard to the following description, appended claims, and accompanying drawings, wherein:

DETAILED DESCRIPTION OF THE INVENTION

Figure 1:
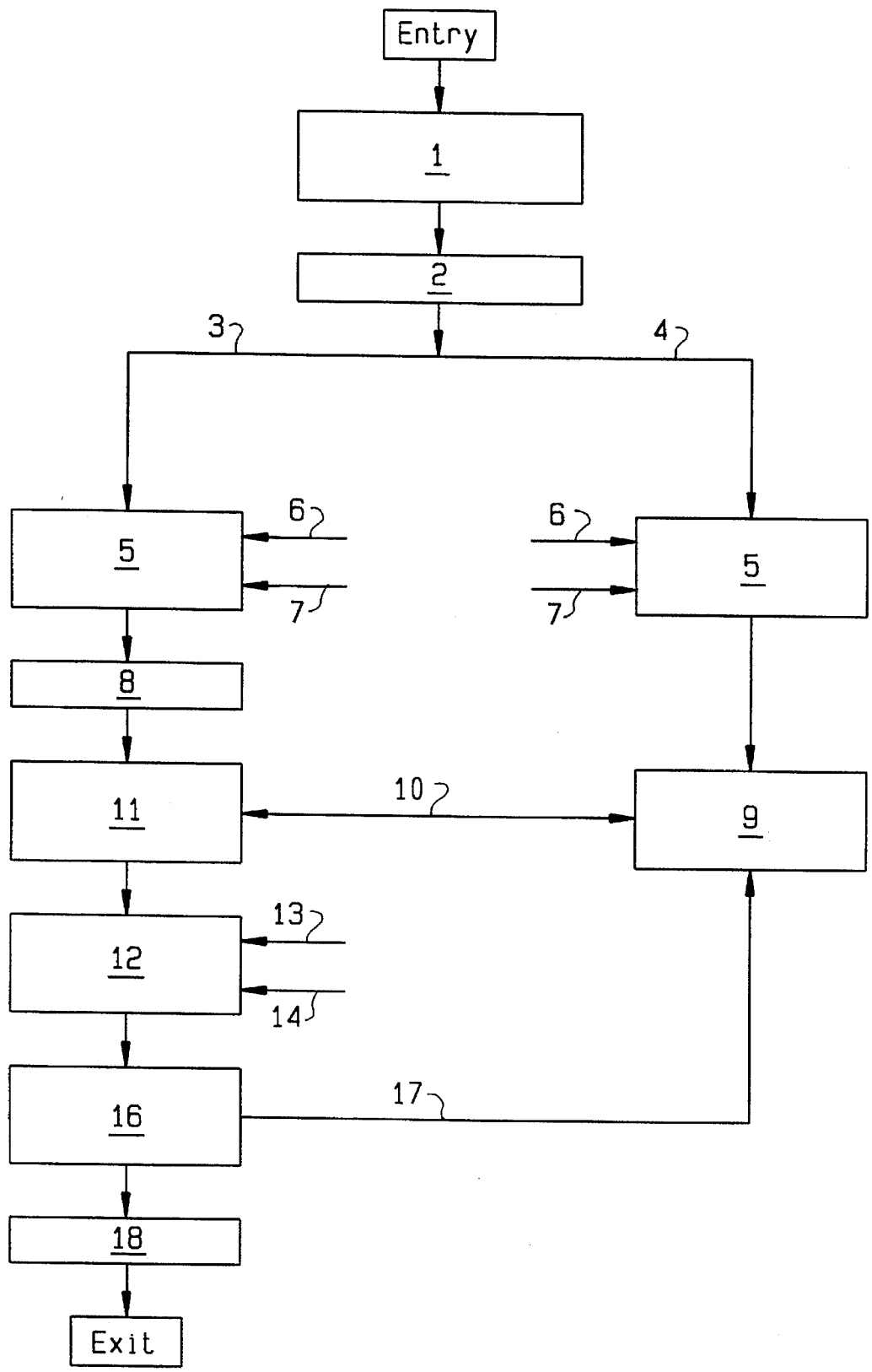
FIG. 1 shows a first embodiment of a process flow diagram of the present invention.

The present invention is applicable to a broad spectrum of granulometric sizes of ore which may vary during various stages, from crushing stages to dry fine grinding. The present invention recovers metal, particularly copper, from an ore containing same, by a process of first wetting the ore with $H_2SO_4$ and water, repulping, separating fine and coarse fractions and pile leaching of the coarse fraction.

In this process, copper-bearing ores are sulfatized by first wetting the copper source ore with controlled amounts of $H_2SO_4$ and water. The amount of sulfuric acid applied to the ore can vary between about 5 and 500 kg/MT, and preferably between about 15 and 60 kg/MT. In addition, the amount of water which is applied in conjunction with the acid can be up to 250 kg/MT, preferably about 40 to 120 kg/MT. The acid can be concentrated sulfuric acid supplied by a suitable source, while the water may be supplied from conventional sources, a refined process solution or electrolyte from the electrolytic copper extraction stage, which electrolyte would otherwise be discarded. Aqueous solutions of sulfuric acid can also be used.

The ore has grain sizes between those of a product obtained by dry fine grinding and one obtained by crushing, and this stage can be conducted in any conventional reactor appropriate for such purposes. A preferred reactor is a rotating drum. As noted above, the purpose of this stage is to uniformly wet, rather than agglomerate, the ore. This treatment fundamentally alters the surface characteristics of the ore are so that its thickening and filtration properties are substantially increased.

The wetted ore is then held (i.e., aged or cured) for a period of time sufficient to obtain maximum sulfatization of the oxidized and sulfurized copper in the ore. Depending upon the characteristics of the initial material, the wetted material may pass directly after a short time to the repulping stage described below or, alternatively, may be held for a period of up to three months or longer, for the purpose of producing a high degree of sulfatization, which also promotes the sulfatization of copper sulfides. This wetting and holding stages will generally take between about 5 minutes and one year, depending upon the specific ore.

After this stage, the ore is repulped by way of an aqueous solution for a very short period of residence time of between about 5 minutes and 24 hours, and generally not longer than about 10 minutes, which is sufficient for most of the sulfatized copper to be extracted.

The sulfatized product is repulped in an aqueous solution in conventional reactors, such as washing drums which are suitable for the ore having the initial grain size varying between the size resulting from dry fine grinding and from secondary crushing. In cases where the ore is of a fine grain size or of the type coming from flotation tailings, the repulping may be performed directly in agitated reactors, and in some specific cases the previously discussed process used in the Nchanga plant, Zambia may be used.

The quantities of solution used in repulping may be those sufficient to obtain a pulp having the characteristics necessary for liquid feed thereof to the filtration stage.

It is also possible to treat both the fine and coarse fractions without the necessity of fine grinding of the coarse fraction. Depending upon the initial grain size of the material, the repulped product may be sorted or classified by conventional equipment appropriate for this purpose. If the grain size of the initial material includes coarse fractions, the repulped ore may be sorted and the coarse fraction separated from the fine fraction using any conventional equipment designed for sorting, such as shaking screens, vibratory screens, linear screens, etc. Alternatively, it is possible to sort the pulp while washing. The screen aperture may be equal to or less than 5 mm to separate the fine and coarse fractions. The coarse fractions may be washed directly in the sorting equipment and then subjected to a secondary pile leaching process. The strong solution generated from the secondary pile leaching stage is preferably used in repulping the fine fraction or, alternatively, mixed with the strong solution generated in the thickening, washing and/or filtration stage.

Since the fine fraction is separated from the coarse fractions, one among other advantages gained by the present invention is that the pile leaching process is performed at very high specific flows, which substantially reduces the leaching period as compared with that of conventional pile leaching. Moreover, the secondary leaching may be processed with the same solutions generated in the overall process itself, reducing the overall cost of operation.

The copper is generally concentrated in the fine fraction. The fine fraction of pulp, to which a flocculent has previously been added, may be sent to thickening stages and countercurrent washing and then to filtration or, alternatively, directly to filtration, depending upon its percentage of solids. Conventional thickening and filtration reactors of the types generally employed in the hydrometallurgy of common metals are used for the thickening and filtration stages. Flocculants administered in controlled doses can be used in either situation.

In addition, the present invention inhibits the dissolution of silica and sulfatizes copper-bearing ores, enabling small capacity plants to efficiently extract copper. In the present invention, it is also possible to make maximum use of the heat generated by the exothermal reactions during the process, which permits treatment of some refractory ores not satisfactorily treatable by known alternatives, as well as making it possible greatly to reduce the inventories of copper in process as compared with conventional processes, and since it exhibits very rapid kinetics of solution, it is possible to obtain high productions of copper in plants with small capacity.

Moreover, in certain instances the coarse fraction is often disintegrated into a fine fraction as a result of the aging or curing stage, thus eliminating the need for fine grinding.

The copper in solution may be recovered by any conventional processes, in particular by solvent extraction-electrowinning techniques. Accordingly, the present invention economically produces a high yield of copper, requiring very low inventories than the conventional alternatives.

The above-described process may be carried out alternatively as shown in the different embodiments of FIGS. 1–5. As has been stated above, depending upon the initial grain size, it is possible to carry out a great variety of configurations as will be explained below. Each embodiment depicted in the figures incorporates the following basic aspects:

1) Preliminary wetting of the ore to improve its specific thickening and filtration rates as effected by an acid cure of the ore;

2) Primary leaching of the mulfatized ore for very short periods;

3) Independent processing of the fine and coarse fractions. In general, the preleached and sorted coarse fractions are subjected to a secondary pile leaching, using the refined strong solution generated in the SX process as a leaching agent, while the fine fractions are subjected to a filtration stage.

The present invention has been described and illustrated in terms of different embodiments. The same element number has been used to designate the same or an equivalent step or means in the five embodiments which are illustrated. Also, the following tables give the particulars of the flow diagrams of these alternatives, with specific reference to the sequences shown in FIGS. 1 to 6.

FIG. 1 shows one embodiment of the process step discussed above. In this embodiment, the copper-bearing ore is crushed into fragments in step 1, using conventional primary, secondary and tertiary crushing methods. The crushed ore is sorted in step 2 and then separated into fine fraction 3 and coarse fraction 4. Both fine and coarse fractions are wetted using water in rotating drums in step 5 and the refining strong solution 6 obtained from the copper extraction processing and concentrated $H_2SO_4$ 7 are fed to both drums. The refined strong solution 6 and the concentrated $H_2SO_4$ 7 may be fed simultaneously, mixed and then fed or separately fed in any order. The fine fraction is pile cured in step 8 while the coarse fraction is pile leached at a high specific flow in step 9. The strong solution 10 which has percolated through the coarse fraction is recycled and fed to the repulping step 11. The pile cured fine fraction are repulped in a washing drum using the strong solution 10 under pressure in step 11. The repulped fined fraction is then filtered and washed in step 12, using water 13 and flocculent 14. The strong solution from step 12 is extracted by solvents in step 16, via conventional methods. The refined strong solution 17 from step 16 is fed to step 9 for pile leaching. The copper is finally extracted by conventional electrolytic methods in step 18.

EMBODIMENT OF FIG. 2

Figure 2:
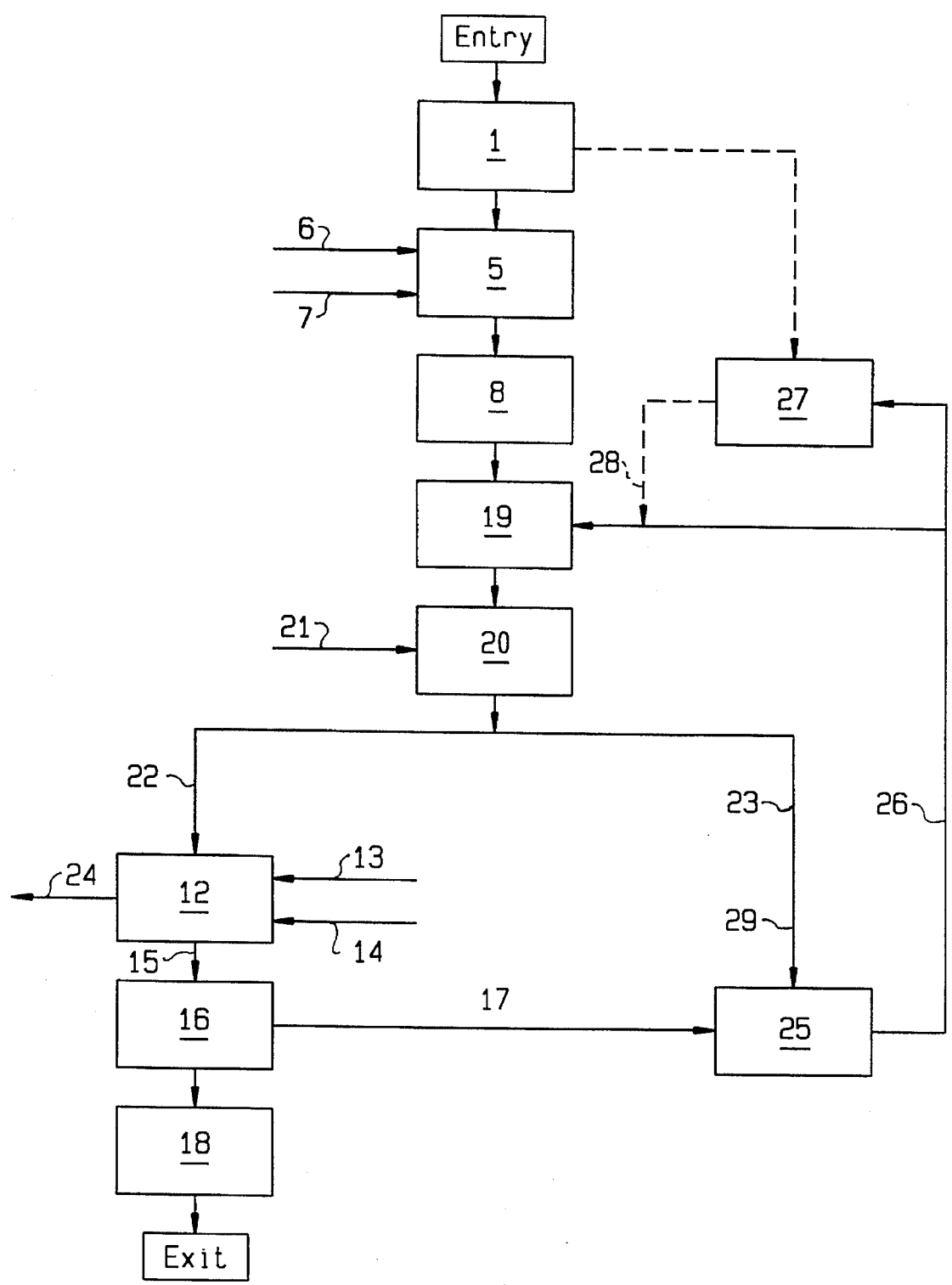
FIG. 2 shows a second embodiment of a process flow diagram of the present invention.

FIG. 2 shows another embodiment of the process step discussed above. In this embodiment, the copper-bearing ore is crushed into fragments in step 1, using conventional primary, secondary and tertiary crushing, as in the embodiment of FIG. 1. In this embodiment steps 2–4 of the embodiment of FIG. 1 are omitted. The crushed ore is then wetted using water in a rotating drum in step 5 and the refining solution 6 and concentrated $H_2SO_4$ 7 are fed to the drum. The refined strong solution and the concentrated $H_2SO_4$ may be fed simultaneously, mixed and then fed or separately fed in any order. The crushed ore is then pile cured in step 8 and then repulped in a washing drum in step 19 using the strong solutions 26, 28 obtained during the secondary pile leaching of the coarser fraction 23 in step 25, which uses the refined strong solution 17 obtained during the copper extraction process in step 16. The wet crushed ore is sorted in step 20 and washed in step 21 for refining the coarse fraction. The fine fraction 22 (< 2 mm in grain size) and the coarse fraction 23 (> 2 mm in grain size) are separated at this point.

The fine fraction is processed according to the steps 12 through 18 defined in the embodiment of FIG. 1. However, in step 12, the residue 24 from the filtration and wash is separated and dumped out, and the refined strong solution 17 from step 16 is used for secondary pile leaching of the coarse fraction in step 25. The residue strong solution 26 obtained from the secondary pile leaching step 25 is divided for feeding to a neutralization pile 27 obtained during the crushing step 1 and to the repulping step 19. The strong solution 28 used for leaching the neutralization pile is fed also to step 19, which in turn fellows into the secondary pile leaching step 25, in step 29.

EMBODIMENT OF FIG. 3

Figure 3:
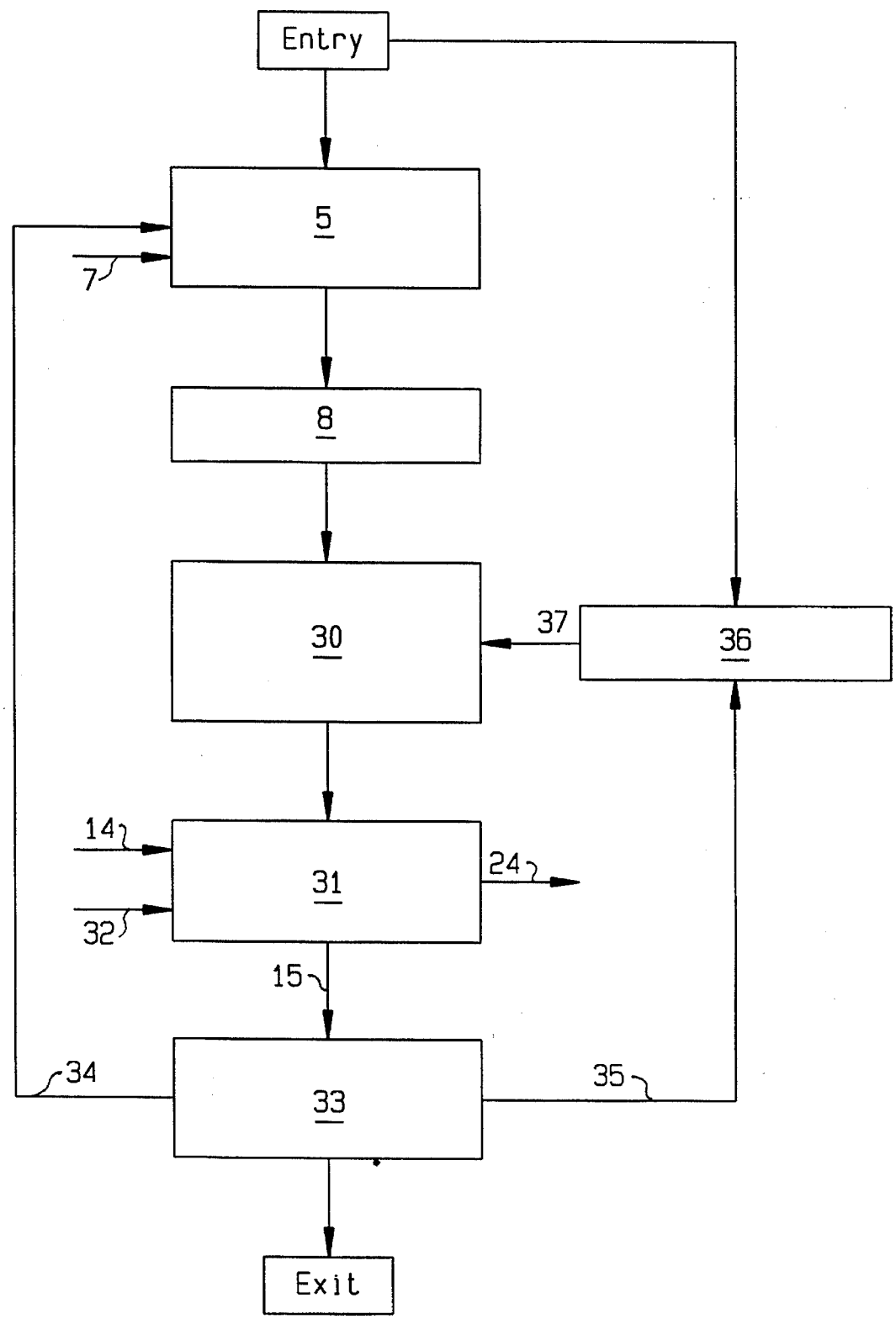
FIG. 3 shows a third embodiment of a process flow diagram of the present invention.

FIG. 3 shows another embodiment of the process step discussed above. In this embodiment, the flotation tailings bearing copper from dumps are wetted in a rotating drum as processed in step 5 of the embodiment of FIG. 1. Concentrated $H_2SO_4$ 7 is introduced into the drum. The sulfatized tailings are pile cured in step 8 and then repulped in an agitated reactor and washing drums in step 30, with the strong solution 37 under pressure, obtained from conventional hydrometallurgical process 36, which uses the refined strong solution 35 obtained during the solvent extraction-electrowinning copper extraction process 33. Thereafter, the repulped ore is thickened and/or filtered and washed in step 31, while feeding flocculent 14 and wash solution 32. The residue 24 from step 31 is separated and discharged. The strong solution 15 from step 31 is fed to the conventional solvent extraction-electrowinning copper extraction method 33. The refined strong solution 34,35 from step 33 is reintroduced to step 5 and introduced to the conventional hydrometallurgical process 36. Note that a fresh copper bearing ore is also introduced into the conventional process 36, the strong solution 37 obtained therefrom being fed to step 30.

EMBODIMENT OF FIG. 4

Figure 4:
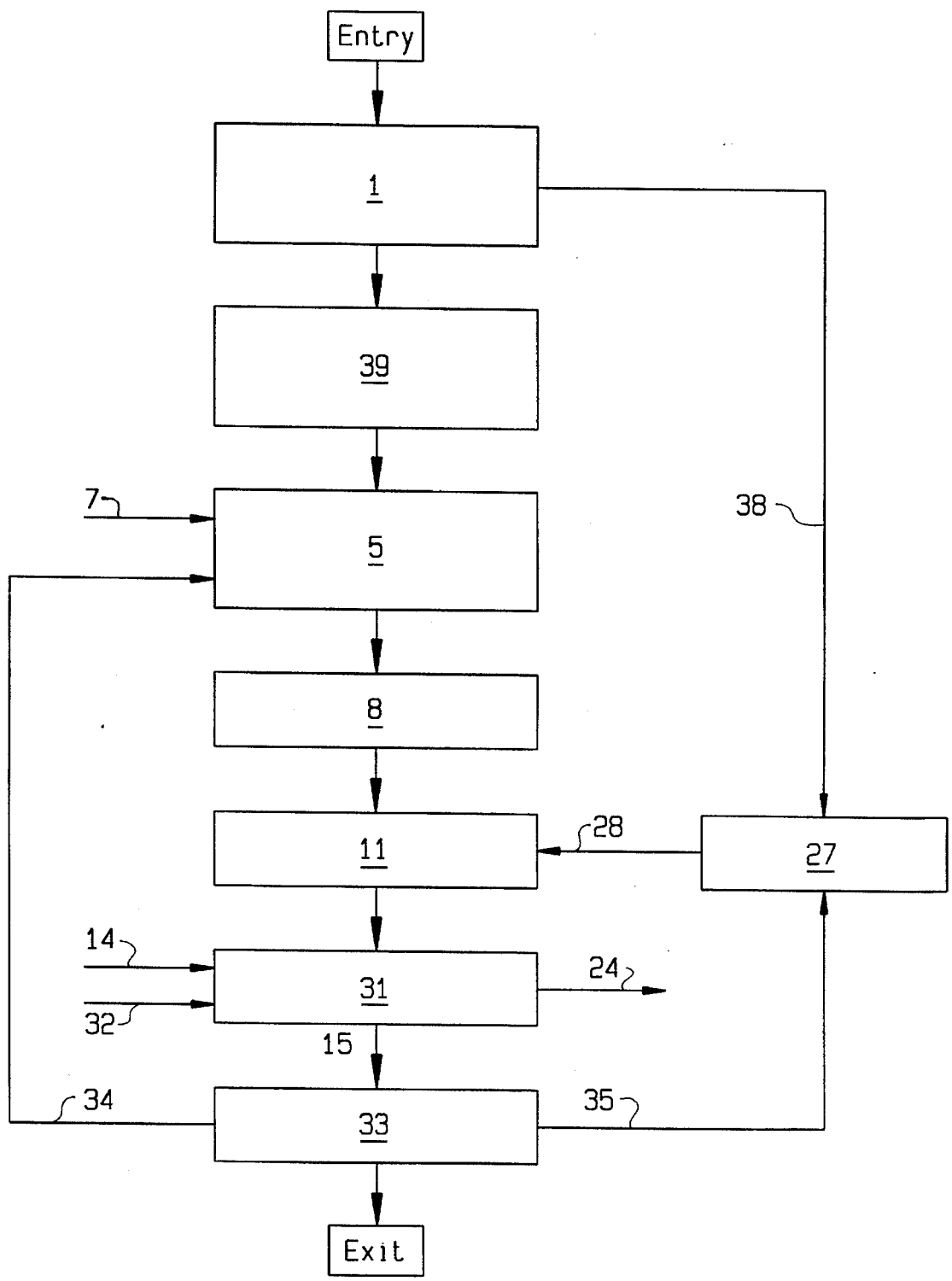
FIG. 4 shows a fourth embodiment of a process flow diagram of the present invention.

FIG. 4 shows another embodiment of the process step discussed above. The copper bearing ore is crushed into fragments, using conventional primary, secondary and tertiary crushing and sorted in step 1. The dry fine grinding or fraction 39 is then wetted in a rotating drum in step 5 and concentrated $H_2SO_4$ 7 and the refined strong solution 34 from step 33 are added thereto. The sulfatized fine fraction is then pile cured in step 8 and then repulped in step 11 using the strong solution 28 obtained from leaching of the neutralization pile 27 using the refined strong solution 35 from step 33. The repulped fine fraction is further thickened and/or filtered and washed in step 31, while feeding a flocculent 14 and a wash solution 32. The residue 24 from step 31 is dumped out, while the strong solution 15 therefrom is fed to the conventional solvent extraction-electrowinning copper extraction processing 33. The refined strong solution 34,35 from step 33 is reintroduced to step 5 and to the neutralization pile 27, which is the coarse fraction 38 from step 1, for leaching. The strong solution 28 from leaching of the neutralization pile is reintroduced into the repulping step 11.

EMBODIMENT OF FIG. 5

Figure 5:
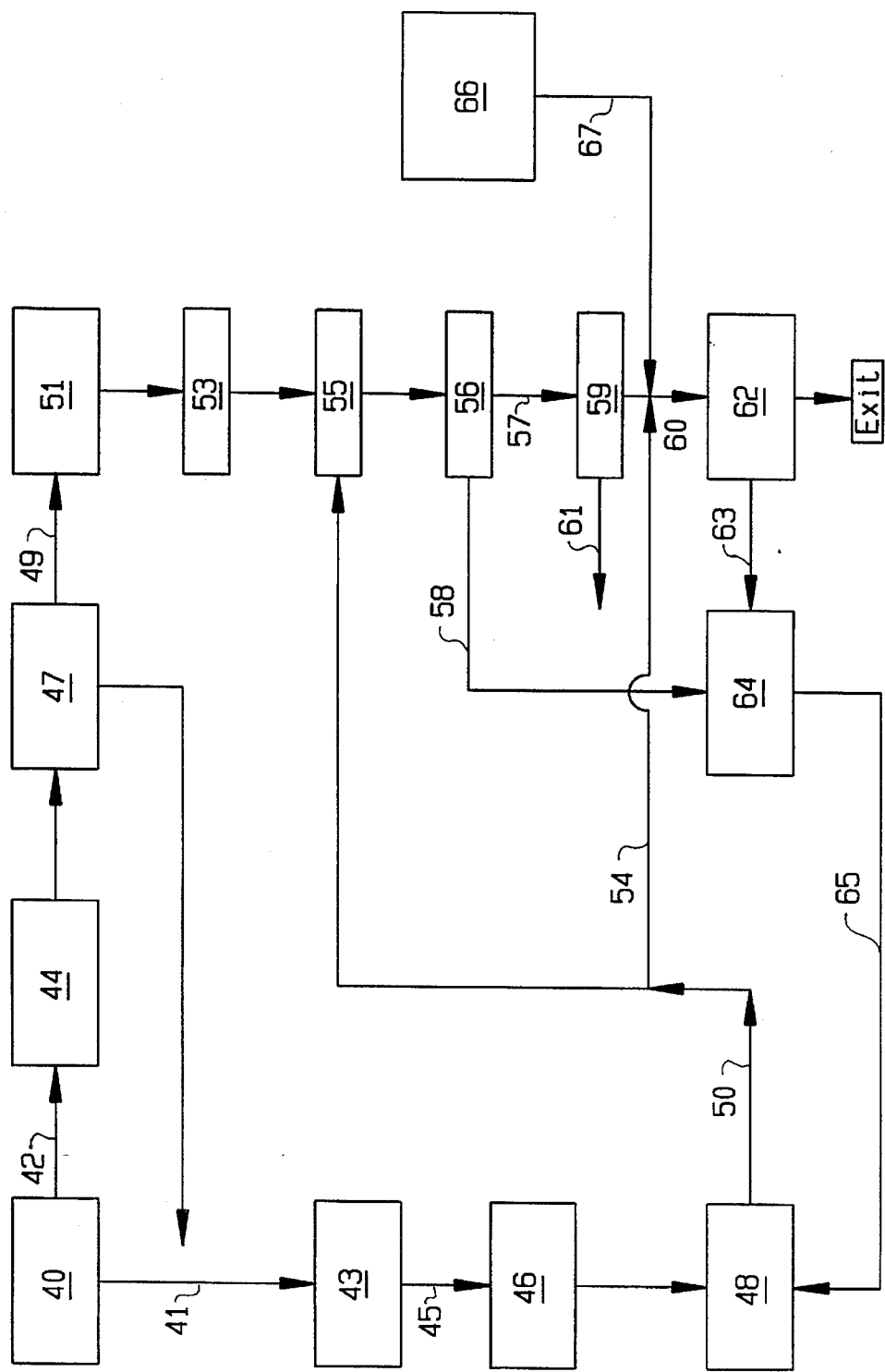
FIG. 5 shows a fifth embodiment of a process flow diagram of the present invention, showing an example of industrial application.

FIG. 5 shows another embodiment of the process step discussed above, illustrating an example of the process from Mina Sur fissure 40. New ore 41 is introduced for pan leaching in step 43. Altered ore 42,44 is sorted into small fragments having the grain size less than ⅜" and large fragments having the grain size greater than ⅜"in power screen equipment in step 47. The spalls 45 from the pan leaching step are agglomerated in step 46. The agglomerated spalls are pile leached in step 48. The strong solution 50,54 with arsenic removed therefrom, obtained in step 48, is fed to the repulping step 55 and to the solvent extraction-electrowinning processing 62.

The sorted small fraction 49 is agglomerated in step 51 and then cured in step 53 and the sorted large fraction 52 are introduced into the pan leaching step 43 along with the new ore 41. The agglomerated ore in step 53 is repulped in a washing drum using the strong solution 50, and then sorted via a conventional vibratory screen in step 56. The sorted fine fraction 57 having the grain size less than 2mm is filtered and washed in step 59. The residue 61 from step 59 is discarded. The sorted coarse fraction 58 having the grain size greater than 2 mm is pile leached in step 64 using the refined strong solution 63 containing arsenic obtained during the solvent extraction-electrowinning processing. After the filtration and wash step 59, the strong solution is processed using a conventional solvent extraction-electrowinning copper extraction process 62. Thereafter, the strong solution 63 containing arsenic from step 62 is introduced into the pile leaching step 64. The strong solution 65 from step 64 is introduced into the pile leaching step 48. The strong solution 67 containing arsenic obtained from a treatment plant for powder from a flash oven is mixed with the strong solutions 54,60 and fed for the solvent extraction-electrowinning copper extracting processing 62.

Figure 6:
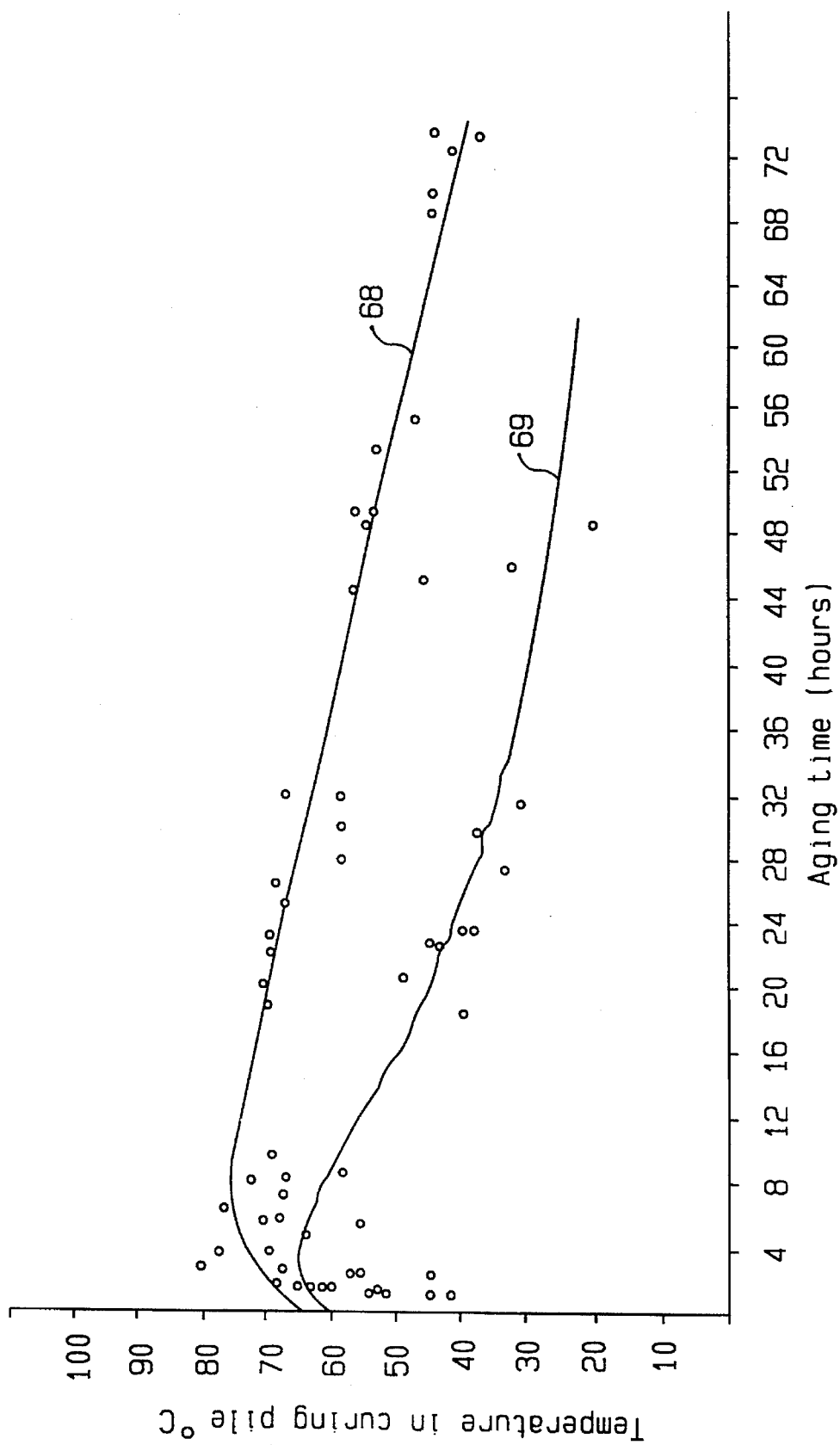
FIG. 6 shows curves of temperature variation in cure pile versus holding or aging time.

FIG. 6 shows curves of temperature variation in a pile curing versus the curing time in hours. Curve 68 represents a 10,000 kg pile and curve 69 represents a 500 kg pile. As shown by the curves, the 10,000 kg pile 68 has a higher temperature curve and the temperature change over the aging time period is less than that of the 500 kg pile. This Fig. is discussed in further detail in Example 4 below.

Figure 7:
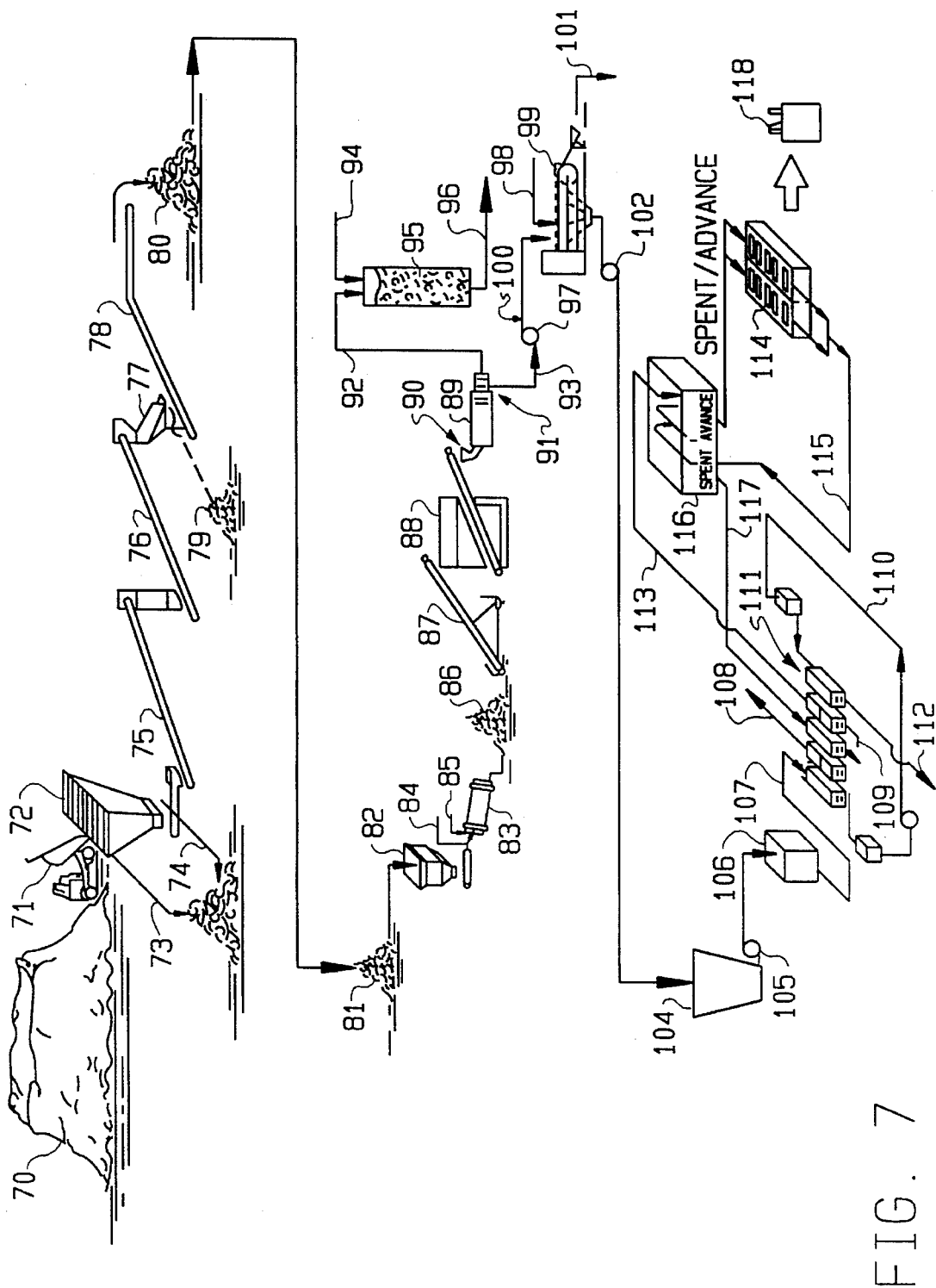
FIG. 7 shows a schematic of a plant for treatment of altered ores.

FIG. 7 shows a system for treating altered copper ores which utilize the present invention. In this particular embodiment, a pile of altered ores 70 are transported via a hopper payloader (vehicle) into a sorting hopper 72 having rails. The sorting hopper separates large size ores and ores having the grain size larger than 6" are discharges through the bottom 74 of the hopper 72 for removal. The smaller separated ores from the sorting hopper 72 are discharged to a first conveyor belt (not labeled), which directs the ores to an inclined conveyor 75 and then to another inclined conveyor 76 for feeding same to a shaking screen 77. The fraction 79 having a grain size larger than ⅜" is separated. The rest of fraction having grain size smaller than ⅜ " is directed to a fraction pile 80 via another inclined conveyor 78. The fraction from the pile 80, 81 is fed to a hopper 82 for feeding to an agglomerating drum 83 via a conveyor belt (not numbered). Water 84 and $H_2SO_4$ 85 are fed into the drum 83 and mixed with the fraction to wet and sulfatize same, and then pile cured 86. The cured fraction is fed into another hopper 88 via preferably a portable conveyor belt 87, which are further fed via a conveyor belt (not numbered) into a washing drum 89. The fraction is further sorted using a mesh 91 while washing and separating the coarse fraction 92 and pulp 93. Water 90 is fed into the washing drum during washing and sorting. The coarse fraction 92 is fed into a secondary leaching percolation pipe 95 and the solvent extraction refined solution 94 (same as 108) is fed to the secondary leaching percolation pipe 95, and the percolated strong solution 96 is processed for further use, while the residue 96A is discarded.

The pulp 93 and wash water 100 are fed to a pump 97 and discharged to a belt filter 99, while feeding a flocculent 98 to the belt filter. The filtered fraction 101 is discharged for dumping, while the filtered strong solution 103 containing copper is fed to another pump 102 for feeding to a feed reservoir 104, which feeds into a feed pump 105, which in turn discharges into a solvent extraction feed lung 106 for feeding to a solvent extraction processing. Specifically, the feed pump 105 discharges to a solvent extraction E1 plant 107 and refined at E2 plant. The refined strong solution 108 (same as 94) is collected from the E2 plant for reuse. Spent material 117 from a spent material reservoir 116 is fed to the S2 plant 109 and output at 0.5 G.P.M. Organic material 110 discharged from the E1 plant is fed to the EL plant, while feeding wash water 111 thereto. The wash water 112 is discarded. The solvent extraction feed 113 from the S1 plant is fed to the electrowinning pilot cells 114 via a reservoir (not numbered, a part of the spent reservoir 116). The drained solution 115 is fed to the spent reservoir 116. The copper is extracted by an electrolytic process 118.

The embodiments described herein and the specific examples of the present invention presented below are for purposes of illustrating the principles of the present invention. Accordingly, the present invention is not to be limited solely to the exact configuration, examples and steps as illustrated and set forth herein.

EXAMPLES

The examples provided herein have been evaluated at the laboratory and pilot levels, so that those skilled in the art of metallurgy can verify the importance of the present invention in the hydrometallurgy of copper. Consequently, persons skilled in such art will be able to configure other alternatives utilizing within the basic principles and spirit of the present invention.

EXAMPLE 1

In this example, the thickening of leached pulps have been compared with that of a conventional agitation leaching.

Standard sedimentation tests were made on pulps obtained with and without application of the present invention. The sample used was a surface composite from the No. 4 dump of altered ores coming from Mina Sur in the Chuquicamata Division, material which is characterized by its high content of kaolinite and montmorrillonite type clays and its great refractoriness to conventional hydrometallurgical processes. A summary showing the operating conditions employed and the metallurgical results obtained is presented in Table No. 1 below.

TABLE 1

Effect of Acid Cure on Sedimentation of Leached Pulps

| Grain size of initial material | 100% −20 Tyler sieve mesh |
|---|---|
| Acid cure time | |
| Without cure (W/OC) | 0:00 hours |
| With cure (WC) | 24:00 hours |
| Leaching time | |
| Without cure (W/OC) | 120 minutes |
| With cure (WC) | 5 minutes |
| Dose of flocculent | 40 g/t |

| TYPE OF OPERATION | DOSE IN CURE STAGE (kg/MT) | | % SOLIDS TO THICKEN-ING | SPECIFIC RATE OF THICKENING ($m^2$/TPD) |
|---|---|---|---|---|
| | $H_2SO_4$ | $H_2O$ | | |
| W/OC | 50 | 0 | 25 | 0.244 |
| WC | 50 | 0 | 25 | 0.177 |
| WC | 50 | 50 | 25 | 0.074 |
| WC | 50 | 100 | 25 | 0.074 |
| W/OC | 50 | 0 | 33 | 0.172 |
| WC | 50 | 0 | 33 | 0.097 |
| W/OC | 50 | 0 | 25 | 0.345 |
| WC | 50 | 50 | 25 | 0.149 |

TABLE 1-continued

Effect of Acid Cure on Sedimentation of Leached Pulps

| Grain size of initial material | 100% −20 Tyler sieve mesh |
|---|---|
| Acid cure time | |
| Without cure (W/OC) | 0:00 hours |
| With cure (WC) | 24:00 hours |
| Leaching time | |
| Without cure (W/OC) | 120 minutes |
| With cure (WC) | 5 minutes |
| Dose of flocculent | 40 g/t |

| TYPE OF OPERATION | DOSE IN CURE STAGE (kg/MT) | | % SOLIDS TO THICKEN-ING | SPECIFIC RATE OF THICKENING ($m^2$/TPD) |
|---|---|---|---|---|
| | $H_2SO_4$ | $H_2O$ | | |
| W/OC | 100 | 0 | 25 | 0.353 |
| WC | 100 | 50 | 25 | 0.118 |
| W/OC | 150 | 0 | 25 | 0.345 |
| WC | 150 | 50 | 25 | 0.118 |

NOTE: In tests without cure, the acid equivalent is added directly to the leaching solution.

An examination of these data establishes that application of the proposed process is associated with a sizeable increase in the rates of separation of phases in sedimentation.

Considering the best of the cases, application of the present invention practically triples sedimentation rates when compared with that of the conventional process.

EXAMPLE 2

In this example, filtration of leached pulps has been compared with that of conventional agitation leaching.

Standard filtration tests were made on pulps obtained with and without application of the proposed process. The samples used were altered ores coming from ore of Mina Sur in the Chuquicamata Division, which material is characterized by its high content of kaolinite and montmorrillonite type clays and where the copper is found basically as atacamite and copper wad.

In addition, tests were performed with new ores of said Mina Sur, in which the contents of kaolinite and montmorrillonite type clays are very low and the copper is found basically as chrysocolla and copper pitch. A summary showing the operating conditions employed and the metallurgical results obtained is presented in Table No. 2 below.

TABLE 2

Effect of Acid Cure on Specific Rates of Filtration: Comparison with Process of Leaching by Conventional Agitation without Prior Acid Cure of Ore

| Initial Moisture | |
|---|---|
| Without acid cure | 0.00% |
| With acid cure | 10.00% |
| Dose of $H_2SO_4$ | 150 kg/mt |
| Acid cure time | |
| Without acid cure | 0:00 hours |
| With acid cure | 24:00 hours |
| Grain size of initial material | 100% −20 Tyler sieve mesh |
| % Solids in suspension | 50% |
| Leaching time | |

| | |
|---|---|
| Without acid cure | 120 minutes |
| With acid cure | 5–15 minutes |
| Dose of flocculent | 40 g/t Magnafloc 351, 0.05% |

| | Specific Filtration Rates kg/hour × m² | |
|---|---|---|
| TYPE of ORE | Without Acid Cure | With Acid Cure |
| Surface Composite No. 4 dump | 80.26 | 488.13 |
| Slope No. 4 dump | 83.71 | 507.24 |
| Altered rock from fissure | 86.31 | 542.68 |
| Altered gravel from fissure | 59.41 | 646.68 |
| Average | 77.42 | 546.24 |
| New Ores | 88.54 | 1,089.18 |

The above results indicate that the filtration rate increases notably when the process of the present invention was applied. For altered ores, on average, application of the novel process increased filtration capacity practically seven times, while for new ores increased about twelve times. This example constitutes one of the basic foundations of application of the present hydrometallurgical process for obtaining copper.

EXAMPLE 3

Standard leaching tests were performed, with and without application of the process of the present invention, on various samples of altered ores from the Mina Sur deposit. These ores are characterized by their high content of kaolinite and montmorrillonite type clays with absorbed copper, where the copper is found as atacamite and copper wad. These ores exhibit high refractoriness to conventional hydrometallurgical processes.

When these ores are processed in percolation pans, mixed 20% by weight with new ores, their recovery (altered ores) does not exceed 30%. Moreover, when this ore was processed in a leaching plant by agitation of 1200 TPD, the process proved not to be technically or economically feasible, clue to its low recovery rate and to critical problems of separation of phases in the thickeners. A summary showing the operating conditions employed and the metallurgical results obtained is presented in Table No. 3 below.

TABLE 3

COMPARISON OF COPPER EXTRACTIONS IN THE LEACHING PROCESS BY CONVENTIONAL AGITATION AND THE PROPOSED PROCESS LABORATORY TESTS

| | |
|---|---|
| % Solids in leaching | 50% |
| Leaching time | Conventional without cure (W/OC): 120 min<br>Proposed with cure (WC): 5–15 min |
| Moisture of initial ore | Conventional without cure (W/OC): 0%<br>Proposed with cure (WC): 10% |
| Grain size initial material | 100% −20 Tyler sieve mesh |

| CURE TIME (DAYS) | TYPE OF OPERATION | EXTRACTIONS OF COPPER FOR DOSES OF $H_2SO_4$ (kg/MT) OF: | | |
|---|---|---|---|---|
| | | 50 | 75 | 100 |
| SURFACE COMPOSITE No. 4 DUMP | | | | |

TABLE 3-continued

COMPARISON OF COPPER EXTRACTIONS IN THE LEACHING PROCESS BY CONVENTIONAL AGITATION AND THE PROPOSED PROCESS LABORATORY TESTS

| | |
|---|---|
| % Solids in leaching | 50% |
| Leaching time | Conventional without cure (W/OC): 120 min<br>Proposed with cure (WC): 5–15 min |
| Moisture of initial ore | Conventional without cure (W/OC): 0%<br>Proposed with cure (WC): 10% |
| Grain size initial material | 100% −20 Tyler sieve mesh |

| CURE TIME (DAYS) | TYPE OF OPERATION | EXTRACTIONS OF COPPER FOR DOSES OF $H_2SO_4$ (kg/MT) OF: | | |
|---|---|---|---|---|
| | | 50 | 75 | 100 |
| 0 | W/OC | 39.53 | — | 43.52 |
| 1 | WC | 51.17 | — | 61.25 |
| 3 | WC | 57.22 | — | 65.86 |
| 5 | WC | 50.83 | — | 62.12 |
| ALTERED GRAVEL FROM FISSURE | | | | |
| 0 | W/OC | 43.89 | — | 47.77 |
| 1 | WC | 54.52 | — | 54.94 |
| 3 | WC | 54.52 | — | 66.65 |
| 5 | WC | 53.26 | — | 68.23 |
| ALTERED ROCK FROM FISSURE | | | | |
| 0 | W/OC | 46.41 | — | 51.17 |
| 1 | WC | 56.95 | — | 59.92 |
| 3 | WC | 46.19 | — | 68.72 |
| 5 | WC | 54.22 | — | 73.75 |
| SLOPE No. 4 DUMP | | | | |
| 0 | W/OC | — | 33.52 | 39.61 |
| 1 | WC | — | 48.24 | 49.40 |
| 3 | WC | — | 47.82 | 52.70 |
| 5 | WC | — | 49.66 | 53.57 |

The above results indicate, in all cases of the proposed process, a notable increase occurs in the extractions of copper as compared to conventional system not utilizing the present process.

EXAMPLE 4

In this example, the temperatures reached in the proposed process is considered. Wetting tests on altered ores in stock were performed with doses of $H_2O$ and $H_2SO_4$ of 100 kg/MT respectively in a pilot agglomerating drum 0.75 m in diameter×2.3 m in length. The grain size of the initial material was 100% (<⅜"). The product from the drum was used to build sulfatization piles of 500 kg and 10,000 kg, respectively, and systematic measurements of the temperatures reached were made.

A summary showing the results obtained is presented in FIG. 6, in which it may be seen that, as the size of the pile increases, temperatures remain higher over time, evidently due to the smaller heat losses due to the effect of the mass/surface relationship. For example, it is noted that in the 500 kg pile (69 in FIG. 6) the temperature reached at 72 hours of rest is practically the ambient temperature, whereas in the 10,000 kg pile 68 the temperature is maintained at 40 degrees Celsius. It must be pointed out that temperature is an important variable in hydrometallurgical processes.

EXAMPLE 5

In this process, application of the process to treatment of oxidized ores from "El Abra" is considered. The oxidized ores of El Abra represent a mineral source whose estimated reserves are 462 million tons, with an average total copper assay equivalent to 0.92%. Mine geology studies have classified this ore into three categories:

Type 1: Biotitic, representing between 20 and 25% of the deposit.

Type 2: Phyllitic, representing about 5% of the deposit.

Type 3: Feldspathic or potassic, representing between 70 and 75% of the deposit.

Laboratory Evaluation of the Embodiment of FIG. 1

This alternative considers the following sequential stages:

Primary, secondary and tertiary crushing in step 1

Dry classification to 4 mm in steps 2,8,11,12

Acid cure, pulping and filtration of <4 mm fraction

Pile leaching of >4 mm fraction

Recovery of copper dissolved by SX and EW techniques in step 33.

The operating conditions investigated were the following:

| | |
|---|---|
| Grain size of initial material | 100% (<3/8") |
| Separating size for fine fraction | 4 mm |
| Assays of (<4 mm) fraction | El Abra #1: 1.52% |
| | El Abra #3: 2.11% |
| Doses in cure stage | |
| of (<4 mm) fraction | $H_2SO_4$: 40–60–80– 100 kg/MT |
| | $H_2O$: 100 kg/MT |
| Sulfatization time | 1–3–5 days |
| % Solids in leaching | 50% |
| Leaching time | 5 minutes |
| Dose of flocculent prior to filtration | 40 g/t Magnafloc 351, 0.05% |
| Wash $H_2O$ in filtration | 0.33 kg/MT of ore |

For the conditions evaluated, the best metallurgical results are obtained by applying the following operating conditions for the fine fraction, as listed below:

| ITEM | ORE EL ABRA #1 | ORE EL ABRA #3 |
|---|---|---|
| Grain size of initial material | 100% <4 mm | 100% <4 mm |
| Doses in cure stage (kg/MT) $H_2O$ | 100 | 100 |
| $H_2SO_4$ | 60 | 60 |
| Aging time (days) | 3 | 3 |
| $H_2O$ in repulping of sulfatized product ($m^3$/t of ore at <4 mm) | 1 | 1 |
| Leaching time in repulping (min) | 5 | 5 |
| Dose of flocculent prior to filtration (g/t of ore at <4 mm) | 40 | 40 |
| Wash $H_2O$ in filtration ($m^3$/t of ore at <4 mm) | 0.33 | 0.33 |

For the conditions indicated, it is possible to obtain the following metallurgical results:

| ITEM | ORE EL ABRA #1 | ORE EL ABRA #3 |
|---|---|---|
| Extraction of copper | 82.95 | 84.66 |
| Consumption of $H_2SO_4$ (kg/MT) | 52.60 | 47.42 |
| Specific filtration rates (kg/hr × $m^2$) | 1,501 | 1,421 |
| Average thickness of cake (mm) | 7/8 | 9 |
| Moisture in residue (%) | 20.88 | 21.92 |
| Solution of solids (%) | 4 | 5 |
| $H_2SO_4$ in strong solution (gpl) | 6 | 10.2 |

For the overall process, total copper extractions equivalent to 80.47% were estimated, with $H_2SO_4$ consumption of 48.72 kg/MT when pile leaching of the coarse fractions was included.

Laboratory Evaluation of the Embodiment of FIG. 2

This alternative considers the following sequential stages:

Primary, secondary and tertiary crushing in step 1

Acid cure of all ore in step 5

Pulping and classification at 4 mm

Filtration of <4 mm fraction in steps 19,20

Secondary leaching in piles of >4 mm fraction in step 25

Recovery of copper dissolved by SX and EW techniques in step 33

The operating conditions investigated were the following:

| | |
|---|---|
| Grain size of initial material | 100% <3/8" |
| Ore assays | El Abra #1: 1.49% |
| | El Abra #3: 1.80% |
| Doses in cure stage | $H_2SO_4$: 40–50–60 |
| | $H_2O$: 100 |
| Sulfatization time | 1–3–5 days |
| $H_2O$ in pulping ($m^3$/MT) | El Abra #1: 0.50 |
| | El Abra #3: 0.55 |
| Leaching time in pulping (min) | 5 |
| Dose of flocculent prior to filtration | 40 g/t Magnafloc 351, 0.05% |
| $H_2O$ wash in filtration | 0.33 $m^3$/MT of ore |

For the conditions evaluated, the best metallurgical results are obtained by applying the following operating conditions:

| ITEM | ORE EL ABRA #1 | ORE EL ABRA #3 |
|---|---|---|
| Grain size of initial material | 100% <3/8 mm | 100% <3/8 mm |
| Doses in cure stage (kg/MT) | | |
| $H_2O$ | 100 | 100 |
| $H_2SO_4$ | 40 | 50 |
| Aging time (days) | 5 | 3 |
| $H_2O$ in repulping of cured product ($m^3$/MT) | 0.5 | 0.55 |
| Leaching time in repulping (min) | 5 | 5 |
| Dose of flocculent prior to filtration (g/t of ore at –4 mm) | 40 | 40 |
| $H_2O$ wash in filtration of <4 mm fraction ($m^3$/MT) | 0.33 | 0.33 |

For the conditions indicated, it is possible to obtain the following metallurgical results:

| ITEM | ORE EL ABRA #1 | ORE EL ABRA #3 |
|---|---|---|
| Weight of sulfatized product (t/t of ore) | 1.08 | 1.11 |
| Specific rate of filtration (kg/hr × m²) | 2,229 | 2,337 |
| Average thickness of cake (mm) | 9 | 9 |
| Weight of residues (kg/MT of ore): | | |
| >4 mm fraction | 154 | 151 |
| <4 mm fraction | 812 | 781 |
| Moisture of residues (%): | | |
| >4 mm fraction | 5.15 | 10.75 |
| 4 mm fraction | 16.49 | 20.74 |
| Extraction of copper average (%) | 76.48 | 75.38 |
| Consumption of $H_2SO_4$ (kg/MT) | 37.95 | 45.01 |
| Solution of solids (%) | 3.4 | 6.81 |
| $H_2SO_4$ in strong solution (gpl) | 3.5 | 7.70 |

Note that in this embodiment, the ore in particular, has a high degree of disintegration because of the acid cure. The following tabular summary illustrates the phenomenon for the most relevant mesh sizes:

| TYPE OF ORE | TYLER SIEVE MESH | % PARTIAL HEAD | % PARTIAL RESIDUE |
|---|---|---|---|
| El Abra #1 | 6 | 45.09 | 11.55 |
| | 20 | 12.99 | 22.30 |
| | −200 | 2.17 | 16.87 |
| El Abra #3 | 6 | 44.46 | 9.50 |
| | 20 | 14.02 | 24.33 |
| | −200 | 1.95 | 19.24 |

This phenomenon is of great importance in a conventional pile leaching process, since it may generate an excess quantity of fine fractions which would interfere with permeability of the bed in an industrial operation. In the present invention, on the other hand, the generation of fine fractions is favorable. For the overall process, total copper extractions equivalent to 82.5% were estimated, with $H_2SO_4$ consumption of 44.46 kg/MT when the secondary pile leaching of the classified coarse fraction is included.

Preliminary Technical/Economic Analysis of the Processes Developed and the Conventional Pile Leaching Process For the preliminary analysis, it was assumed that the ore treated in plant is a mixture of 25% of No. 1 ore and 75% of No. 3 ore. Moreover, it is considered that the material treated in plant corresponds to a tertiary crushing product, the investments in the mine area being similar for the Embodiments of FIGS. 1 and 2 and pile leaching. A summary showing the principal results of evaluation of the present embodiment of FIGS. 1 and 2, represented as A and B, respectively, in comparison to a conventional pile process, represented as CCP follows (does not consider mine area):

| ITEM | A | B | CCP |
|---|---|---|---|
| Total copper extraction (%) | 80.47 | 82.52 | 75 |
| Consumption of $H_2SO_4$ (kg/MT) | 48.72 | 44.46 | 50 |
| Size of plant: MTD | 60,000 | 60,000 | 60,000 |
| Assay % | 0.97 | 0.97 | 0.97 |
| Recovery dissolved copper (%) | 86 | 86 | 84 |
| Production fine copper first year of production (t) | 138,952 | 147,308 | 117,440 |
| Subsequent annual production (t) | 147,095 | 150,745 | 133,955 |
| Investments (KUS$) | 129,374 | 126,823 | 117,371 |
| Cost of annual operation after first year of operation: | | | |
| KUS$ | 58,890 | 66,400 | 48,550 |
| cUS$/lb | 18.16 | 19.98 | 16.44 |
| Annual income after first year of operation (KUS$) | | | |
| @ 50 cUS$/lb | 162,143 | 166,166 | 147,659 |
| @ 65 cUS$/lb | 210,786 | 216,016 | 191,956 |
| @ 80 cUS$/lb | 259,429 | 265,866 | 236,254 |
| Annual profits after first year of operation (KUS$) | | | |
| @ 50 cUS$/lb | 103,253 | 99,766 | 99,109 |
| @ 65 cUS$/lb | 151,896 | 149,616 | 143,406 |
| @ 80 cUS$/lb | 200,539 | 199,466 | 187,704 |

Moreover, it should be noted that for the cycles of the process (45 days for pile leaching), A and B present as credit a great production of fine copper in the first year of operation, which furnishes the following additional profits when the same exercise as above is performed.

| ITEM | A | B |
|---|---|---|
| Additional fine copper production (t) | 9,992 | 15,148 |
| Additional profits (KUS%) | | |
| @ 50 cUS$/lb | 7,014 | 109,026 |
| @ 65 cUS$/lb | 10,318 | 15,035 |
| @ 80 cUS$/lb | 13,623 | 20,044 |

The above results indicate that the process of the present invention exhibits profitability parameters which are more favorable than that of the conventional pile leaching process.

EXAMPLE 6

In this example, application of the process to the treatment of oxidized ores of Chuqui Norte is considered. The oxidized ores of Chuqui Norte represent a source which amounts to about 317 million tons with an average estimated assay of 0.86% total copper. An experimental program at the laboratory level, very similar to that developed for the oxidized ores of El Abra, was carried out. The relevant results obtained are described below:

Laboiratory Evaluation of the Embodiment of FIG. 1

The best operating conditions for carrying out the process on fine fractions are the following:

| | |
|---|---|
| Grain size of initial material | 100% (<4 mm) |
| Assays | 0.77% total copper |
| | 0.69% soluble copper |
| Doses in agglomeration stage | |
| $H_2O$ | 150 kg/MT |
| $H_2SO_4$ | 40 kg/MT |
| Acid cure time | 5 days |
| Quantity of $H_2O$ in repulping | 1 m³/MT of fine ore |
| Leaching time in repulping (min) | 5 |
| Dose of flocculent prior to filtration | 40 g/t |
| $H_2O$ in filtration | 0.666 m³/MT of ore |

For the conditions indicated, it is possible to obtain the following metallurgical results:

| | |
|---|---|
| Recovery of copper | 84.31% |
| Consumption of $H_2SO_4$ | 27.00 kg/MT |
| Specific rate of filtration | 1,279 kg/h × m² |
| Moisture filtered cake | 16.9% |
| Average moisture cake | 8 mm |

For the process as a whole, extractions of total copper equivalent to 80.40% were estimated, with consumption of $H_2SO_4$ of 19.42 kg/MT when pile leaching of the coarse fractions is included.

Laboratory Evaluation of the Embodiment of FIG. 2

The best operating conditions for carrying out the process are the following:

| | |
|---|---|
| Grain size of initial material | 100% (<⅜") |
| Assays | 0.68% total copper |
| | 0.55% soluble copper |
| Doses in agglomeration stage | |
| $H_2O$ | 100 kg/MT |
| $H_2SO_4$ | 30 kg/MT |
| Acid cure time | 5 days |
| $H_2O$ in repulping | 0.47 m³/MT ore |
| Dose of flocculent prior to filtration <4 mm fraction | 40 g/t (<4 mm) fraction |

For the conditions indicated, it is possible to obtain the following metallurgical results:

| | |
|---|---|
| Recovery of copper | 70.61% |
| Consumption of $H_2SO_4$ | 23.25 kg/MT |
| Specific rates of filtration | 1,160 kg/h × m² |
| Moisture filtered cake | |
| <4 mm fraction | 16.27% |
| >4 mm fraction | 5.33% |
| Average moisture cake | 8 mm |

For the process as a whole, total copper extractions equivalent to 84.72% were estimated, with consumption of $H_2SO_4$ of 27.09 kg/MT when a secondary leaching of coarse fractions is included.

Preliminary Technical/Economic Analysis Comparing the Processes Developed and the Pile Leaching Process For this preliminary analysis, a plant processing 49,024 MTD of ore with a head assay of 0.86% total copper is considered. It is assumed that the material treated in plant corresponds to a product of tertiary crushing, the investments in the mine area being similar for all three alternatives below. A summary showing the principal results of evaluation of the present embodiment of FIGS. 1 and 2, represented as A and B, respectively, in comparison to a conventional pile process, represented as CCP follows (does not consider mine area):

| ITEM | A | B | CCP |
|---|---|---|---|
| Total copper extraction (%) | 80.40 | 84.72 | 70.7 |
| Consumption of $H_2SO_4$ (kg/MT) | 19.42 | 27.09 | 25.50 |
| Recovery dissolved copper (%) | 86 | 86 | 84 |
| Production fine copper first year of production (t) | 110,741 | 123,531 | 81,972 |
| Subsequent annual production (t) | 123,724 | 130,374 | 108,799 |
| Investments (KUS$) | 108,941 | 118,935 | 95,937 |
| Cost of annual operation after first year of operation: | | | |
| KUS$ | 42,669 | 48,943 | 33,123 |
| cUS$/lb | 18.19 | 19.98 | 16.44 |
| Annual income after first year of operation (KUS$) | | | |
| @ 50 cUS$/lb | 117,288 | 123,592 | 100,740 |
| @ 65 cUS$/lb | 152,474 | 160,670 | 130,962 |
| @ 80 cUS$/lb | 187,661 | 197,747 | 161,185 |
| Annual profits after first year of operation (KUS$) | | | |
| @ 50 cUS$/lb | 74,619 | 74,649 | 67,717 |
| @ 65 cUS$/lb | 109,805 | 111,727 | 97,839 |
| @ 80 cUS$/lb | 144,992 | 148,804 | 128,062 |

Moreover, it should be noted that because of the cycles of the process (90 days for pile leaching), A and B present as credit, a great production of fine copper in the first year of operation, which furnishes the following additional profits when the same exercise as above is performed.

| ITEM | A | B |
|---|---|---|
| Additional fine copper production (t) | 15,071 | 21,761 |
| Additional profits (KUS%) | | |
| @ 50 cUS$/lb | 10,569 | 14,488 |
| @ 65 cUS$/lb | 15,553 | 21,684 |
| @ 80 cUS$/lb | 20,536 | 28,880 |

EXAMPLE 7

In this example, application of treatment of old spalls from Mina Sur is considered. Continuous processing of the ores of Mina Sur in pans has led to the accumulation of spalls which for the most part have been stored in a specific sector of the dump. It is estimated that at present some 60 million tons, with an average copper assay of close to 0.47%, are accumulated in a single sector of the dump. The physical characteristics of these spalls render them practically impermeable and not treatable by the conventional methods. Based on the foregoing, a research program was initiated to evaluate the following alternatives:

A. Dry Classification of Spalls

Fine fraction : Acid cure, repulping and filtration

Coarse fraction: Incorporation in Chuqui oxide spalls

B. Acid Cure On Entire Mass Of Spalls, Repulping And Wet Classification

Fine fraction : Filtration

Coarse fraction: Incorporation in Chuqui oxide spalls

Evaluation at Laboratory Level of the Embodiment of FIG. 1 (Preliminary Dry Classification of Spalls)

The best operating conditions established for carrying out the process were the following:

| | |
|---|---|
| Dry classification of spalls | 4 mm |
| >4 mm fraction | Incorporation in Chuqui oxide spalls |
| <4 mm fraction | Acid cure, repulping and filtration |
| Grain size initial fine material | 100% <4 mm |
| Dose in agglomeration stage | |
| $H_2O$ | 100 kg/MT fine fraction |
| $H_2SO_4$ | 50 kg/MT fine fraction |
| Aging time | 5 days |
| $H_2O$ in repulping | 867 kg/MT fine fraction |
| Leaching time in repulping (min) | 5 |
| Dose of flocculent prior to filtration | 40 g/t fine fraction |
| Wash $H_2O$ in filtration | 333 kg/MT fine fraction |

For the conditions indicated, it is possible to obtain the following metallurgical results:

| | |
|---|---|
| Extraction of copper | 67.91% |
| Consumption of $H_2SO_4$ | 42.70 kg/MT fine fraction |
| Specific rate of filtration | 987 kg/hr × m² |
| Moisture filtered cake | 19.17% |
| Average thickness cake | 6.5 mm |

If it is assumed that the >4 mm fraction has a leaching efficiency of 70% and a similar acid consumption, with the following overall efficiencies:

| | |
|---|---|
| Recovery of copper | 68.39% |
| Consumption of $H_2SO_4$ | 41.70 kg/MT |

Evaluation at Laboratory Level of the Embodiment of FIG. 2: Acid Cure on Entire Mass of Spalls, Pulping and Wet Classification The best operating conditions established for carrying out the process were the following:

| Doses in cure stage | |
|---|---|
| $H_2O$ | 100 kg/MT |
| $H_2SO_4$ | 50 kg/MT |
| Aging time | 3 days |
| $H_2O$ in repulping | 575 kg/mt |
| Wet classification | 8 Tyler sieve mesh |
| Repulping time (min) | 5 |
| Dose of flocculent prior to filtration | 40 g/t of solids filtrate |
| Wash $H_2O$ in filtration | 192 kg/MT of spalls |

For the conditions indicated, it is possible to obtain the following metallurgical results:

| | |
|---|---|
| Weight of sulfatized product | 1.15 t/t of spalls |
| Extraction of copper | 69.68% |
| Consumption of $H_2SO_4$ | 47.79 kg/MT of spalls |
| Specific rate of filtration | 917 kg/hr × m² |
| Moisture filtered cake | 21.26% |
| Average thickness cake | 6/7 mm |

As in the case above, if it is assumed that the leaching efficiency of the >8 Tyler sieve mesh fraction is 70% with a similar acid consumption, the total efficiencies of the process would be the following:

| | |
|---|---|
| Recovery of copper | 82.92% |
| Consumption of $H_2SO_4$ | 47.79 kg/MT |

EXAMPLE 8

In this example, application of treatment of altered ores at pilot level is considered. A schematic flow diagram of all the installations making up the pilot plant is presented in FIG. 7. The central idea is to continue processing the (> ⅜") fractions in pans and the (<⅜) fraction by the proposed process.

Treatment of the altered ores starts with their transfer from the stocks for sorting, where they are classified into fractions having >⅜" and <⅜", the (>6") fraction having previously been eliminated. The ⅜") fraction is transferred to the oxide pilot plant. The first stage of the process consists of agglomerating the ore in a pilot drum 0.75 m in diameter by 2.3 m in length, provided with a network feed of $H_2O$ and $H_2SO_4$. The design of the equipment makes it possible to vary the speed of rotation and inclination of the drum 83. A variable-speed belt regulates the feed. The agglomerated ore is transferred in small cars to rest piles for sulfatization. The sulfatized ore is then stored in the hopper 88 by means of a portable belt 87.

The second and final stage consists of purification and concentration of the strong leaching solutions of SX-EW techniques. For this purpose, a Denver SX plant 109 of 0.5 GPM is used, while electrolytic extraction of copper is effected in one of two pilot cells (114), each of 0.1 m³ capacity, which operate with a current rectifier and variable voltage (11 anodes of Pb-Ca alloy and 12 initial sheets are used).

The refined solution from the SX process is finally used in the leaching of previously sorted coarse fraction.

The analyses of chemical, microscopic and instrumental characterization gave the following results:

| | |
|---|---|
| Principal copper-bearing species | Atacamite, copper wad |
| Principal types of clays | Chlorite, kaolinite and montmorillonite with copper in their composition |
| Species determined by electronic microscopy analysis | Copper and manganese ores (copper wad and copper pitch), corresponding to amorphous oxides of Fe, Cu, Mn, Si, K, Na, etc.; Cryptomelane, corresponding to an amorphous oxide of manganese with barium and copper in its composition; Transparent minerals such as atacamite and chrysocolla opaque minerals such as magnetite, hematite, ilmenite, rutile, sphene, limonite and occasionally native copper, cuprite, chalcopyrite, pyrite and covelline; Inclusions of chrysocolla in large grains of quartz; |
| Crystalline species detected by means of X-ray diffraction analysis | Kaolinite, alpha quartz and plagioclase feldspar; |
| X-ray fluorescence analysis: Majority elements Minority elements Trace elements | Si, Al, K; Cu, Mn, Ti, Ca; S, Ba, Zr, Zn, P, Sr, Rb, Cr, As; |
| Classic chemical analysis and distribution of copper by mesh size | (Ref. to Tables 4 to 6). |

The altered ores have a high content of insoluble copper, which for different samples may vary from 33 to 58% of total copper present in the sample. For this reason, extractions of copper from this ore are generally low. It should be noted that the project of leaching by conventional agitation at PELA took into account a copper recovery of 55% from leaching, but the process failed to prosper and thus discontinued.

Tables 4, 5 and 6 shows the following: typical composition of altered ores of Mina Sur; granulometric characterization and distribution of copper by mesh of the (<3/8") fraction fed to the pilot plant; and the content of impurities in the (<3/8") fraction used in the pilot campaign, respectively.

TABLE 4

TYPICAL COMPOSITION OF ALTERED ORES OF MINA SUR

Composite Surface No. 4 Dump is represented by I;
Slope No. 4 Dump is represented by II;
Altered Rock Fissure is represented by III;
Altered Gravel Fissure is represented by IV;
Polycom Product Pilot is represented by V; and
Polycom Product Semi-Ind is represented by VI.

| | ORIGIN AND COMPOSITION (%) | | | | | |
|---|---|---|---|---|---|---|
| | I | II | III | IV | V | VI |
| TOTAL COPPER: | 1.58 | 1.27 | 0.64 | 1.74 | 1.40 | 1.29 |
| SOLUBLE COPPER: | 0.75 | 0.54 | 0.32 | 0.82 | 0.68 | 0.87 |
| INSOLUBLE COPPER: | 0.87 | 0.73 | 0.32 | 0.92 | 0.72 | 0.42 |
| COPPER NOT LEACHABLE IN CONVENTIONAL PROCESS (%) | 52.53 | 57.48 | 50.00 | 52.87 | 51.43 | 32.56 |
| IRON: | 5.95 | 5.43 | 3.36 | 3.00 | 5.24 | 4.21 |
| MANGANESE: | 0.22 | 0.27 | 0.09 | 0.60 | 0.23 | 0.24 |
| ALUMINUM: | 10.40 | 13.80 | 9.35 | 9.26 | 10.26 | 9.40 |
| SILICA: | | | | | 50.15 | 58.90 |
| CHLORIDE | | | | | | 0.07 |

TABLE 5

GRANULOMETRIC CHARACTERIZATION AND DISTRIBUTION OF COPPER BY MESH OF (<3/8") FRACTION FEED TO PILOT PLANT

| TYLER MESH | APERTURE (mm) | GRANUL. DISTRIB. | | COPPER | | DISTRIB. CuFT. | |
|---|---|---|---|---|---|---|---|
| | | % PART. | % CUM. | TOTAL | SOLUBLE | % PART. | % CUM. |
| 3 | 6.680 | 2.74 | 2.74 | 1.51 | 1.06 | 3.28 | 3.28 |
| 4 | 4.699 | 4.72 | 7.46 | 1.43 | 1.02 | 5.34 | 8.62 |
| 6 | 3.327 | 6.46 | 13.92 | 1.28 | 0.89 | 6.55 | 15.17 |
| 8 | 2.362 | 7.33 | 21.25 | 1.24 | 0.86 | 7.19 | 22.36 |
| 10 | 1.651 | 7.65 | 28.90 | 1.22 | 0.83 | 7.39 | 29.75 |
| 14 | 1.168 | 7.76 | 36.66 | 1.21 | 0.82 | 7.43 | 37.18 |
| 20 | 0.833 | 9.05 | 45.71 | 1.18 | 0.76 | 8.45 | 45.63 |
| 28 | 0.589 | 7.80 | 53.51 | 1.12 | 0.70 | 6.92 | 52.55 |
| 35 | 0.417 | 8.31 | 61.82 | 1.08 | 0.65 | 7.10 | 59.65 |
| 48 | 0.295 | 9.05 | 70.87 | 1.12 | 0.72 | 80.2 | 67.67 |
| 65 | 0.208 | 7.88 | 78.75 | 1.16 | 0.74 | 7.20 | 74.87 |
| 100 | 0.147 | 6.80 | 85.55 | 1.23 | 0.76 | 6.62 | 81.49 |
| 150 | 0.104 | 5.33 | 90.88 | 1.37 | 0.81 | 5.78 | 87.27 |
| 200 | 0.074 | 4.64 | 95.52 | 1.63 | 0.99 | 5.99 | 93.26 |
| −200 | | 4.48 | 100 | 1.89 | 1.11 | 6.74 | 100 |

TABLE 5-continued

GRANULOMETRIC CHARACTERIZATION AND DISTRIBUTION OF COPPER BY MESH OF (<3/8") FRACTION FEED TO PILOT PLANT

| TYLER MESH | APERT-URE (mm) | GRANUL. DISTRIB. | | COPPER | | DISTRIB. CuFT. | |
|---|---|---|---|---|---|---|---|
| | | % PART. | % CUM. | TOTAL | SOLUBLE | % PART. | % CUM. |
| TOTAL SAMPLE | | | | 1.263 | 0.816 | | |
| COPPER NOT LEACHABLE IN CONVENTIONAL PROCESS (%) 35.39 | | | | | | | |

TABLE 6

CONTENT OF IMPURITIES IN (<3/8") FRACTION USED IN PILOT CAMPAIGN

| SPECIES | COMPOSITION % |
|---|---|
| SILICA | 56.91 |
| ALUMINUM | 8.99 |
| IRON | 4.94 |
| TOTAL COPPER | 1.26 |
| SOLUBLE COPPER | 0.82 |
| POTASSIUM | 1.28 |
| SODIUM | 1.08 |
| MANGANESE | 0.18 |
| CHLORIDE | 0.08 |
| COBALT | 0.003 |
| ARSENIC | 0.005 |
| MOLYBDENUM | 0.004 |
| URANIUM | 10 ppm |

Pilot Tests: Wetting in Agglomerating Drum 83 (FIG. 7)

The agglomeration stage is technically feasible in a broad range of operating conditions:

| | |
|---|---|
| Dose $H_2O$ | 100 kg/MT |
| Dose $H_2SO_4$ | 100–130 kg/MT |
| Revolutions of drum | 7–10 rpm |
| Inclination of drum | 6–10 degrees |
| Residence time in drum | 30–67 seconds |
| Volume occupied by charge | 4.22–8.21 o/v |

It is estimated that to produce 80 TPD of fine copper from the < 3/8" fraction, a drum 3 m in diameter by 9 m in length is required.

Rest Times of Agglomerated Product 86 (FIG. 7)

It was determined that a rest time (curing) of 24 hours is adequate. Temperatures during this period vary between 80° and 50° C.

Repulping State in Washing Drum 89

The repulping stage in washing drums is technically feasible and best results are obtained with the mesh 91 having a size of 2 mm. It is alternatively feasible to consider other sorting methods, such as vibratory screens, which may produce a finer grain size possible with less number of filters.

Filtration Stage 99 (FIG. 7)

Best results are obtained under the following operating conditions:

| | |
|---|---|
| Grain size of material at filtration | 100% <2 mm. |
| % Solids feed to filtration (includes addition of flocculent) | 45–53% |
| Type of flocculent, dose and concentration | Guarfloc, 0.05% 80–130 g/ton filtered residue |
| Type of filter cloth | Multifilament |
| Average vacuum | 43 KPA |
| Doses of $H_2O$ in wash stage | 217–360 lg/ton filtered reidue |

For the conditions indicated, it is possible to obtain the following metallurgical results:

| | |
|---|---|
| Preliminary solution of solid in washing drum | 7% |
| Extraction of copper up to filtration stage (primary leaching) | 58.22% |
| Consumption of fresh $H_2SO_4$ | 98 kg/MT |
| Dry weight coarse reject (>2 mm) in preliminary classification stage | 277 kg/MT of feed |
| Moisture coarse reject (>2 mm) | 10.43% |
| Weight dry filtered cake | 653 kg/MT of feed |
| Moisture filtered cake | 21.77% |
| Average cake thickness | 10.67 mm |
| Dry cake filtration capacity | 878 kg/hr × m$^2$ |
| Content of solids in suspension filtered solution | 20 ppm |

The composition of the filtered solution shows the following results (gpl):

| | |
|---|---|
| Cu | 6.5–7.9 |
| $H_2SO_4$ | 1.0–3.6 |
| Ph | 2.06–2.2 |
| Eh | 471–480 |
| FeT | 4.7–7.1 |
| Fe (II) | 0.16–0.43 |
| Cl | 0.63–0.80 |

Solvent Extraction 109 by a SX Process (FIG. 7)

The best metallurgical results are obtained with application of the following operating conditions:

| | |
|---|---|
| No. of extraction stages | 2 |
| No. of stripping stages | 2 |
| No. of wash stages | 2 |

| | E1 | E2 | S1 | S2 | Wash (EL) |
|---|---|---|---|---|---|
| Specific flow ($m^3/hr \times m2$) | 1.98 2.06 | 1.98 2.06 | 2.46 1.66 | 2.47 1.65 | 2.53 1.61 |
| Continuity of phases | 0 | 0 | 0 | 0 | 0 |
| O/A ratio Without recirculation (W/OR) | 1.04 | 1.04 | 2.0 | 2.0 | 1.87 |
| With recirculation (WR) | W/OR | W/OR | 1.73 | 1.75 | 1.00 |

| | |
|---|---|
| Operating temperature | Ambient |
| Type and concentration of extractant | 50% LIX 984 |
| | 50% ACORGA PT5050 |
| | 25 O/V in Escaid 100 |

For the conditions indicated, it is possible to ensure a minimum extraction of 90%. The rates of crud formation are around 300 liters for every 1,000 cubic meters of solution fed.

Electrolytic Extraction 114 (FIG. 7)

Electrodeposition of the copper contained in the solvent extraction advance solutions is technically feasible. For the conditions evaluated, it is possible to obtain current efficiencies of over 90% with electrolytes having FeT levels of up to 1.3 gpl, 98 ppm manganese, 90 ppm cobalt and 80 ppm chloride. In general, the cathodes obtained are of good chemical quality. With the exception of one yield in which chloride levels reached 128 ppm, the average content of impurities of five yields obtained are as listed below:

| SPECIES | COMPOSITION |
|---|---|
| Copper | 99.9592 |
| Chloride (g/mg) | 18.25 |
| Arsenic | 0.20 |
| Antimony | 0.14 |
| Iron | 0.34 |
| Nickel | 0.10 |
| Lead | 2.32 |
| Bismuth | 0.10 |
| Tellurium | 0.10 |
| Zinc | 0.16 |
| Tin | 0.16 |
| Cadmium | 0.10 |
| Silver | 0.66 |

The addition of Guarfloc remained fixed at 200 g/ton cathode.

Secondary Leaching of Coarse Fraction (>2 mm) Separated in the Sorting Stage

The coarse fractions present copper contents varying between 0.54 and 0.82%, which must be leached to increase overall recovery. Pile leaching at a high specific flow is possible since only the coarse fractions are leached separately. Recoveries of copper reach 65.07% with $H_2SO_4$ consumption of 12.6 kg/MT when the following operating conditions are applied:

| | |
|---|---|
| Preliminary classification mesh | 2 mm |
| Leaching agent | SX process refined solution |
| Average specific flow | 110 liters/hr × $m^2$ |
| Height of pile | 278 m |
| Leaching cycle | 255 hours |
| $m^3$ leachant/MT solid | 7.64 |

Under these conditions the refined increases its concentration of copper by 0.56 gpl.

Extraction of Copper and Consumption of $H_2SO_4$ in Primary Leaching, Secondary Leaching of Coarse Fractions and Total Primary leaching is understood to mean the process and results obtained up until filtration of the pulp and without considering treatment of the coarse fractions. Secondary leaching comprises treatment of the coarse fractions with the refined solution from the SX process 109. Total extraction is the weighted sum of the above values according to the weights of each fraction. The average results are the following:

| | EXTRACTION OF COPPER | CONSUMPTION OF FRESH $H_2SO_4$ | |
|---|---|---|---|
| ITEM | (%) | (kg/MT) | (kg/kg) |
| PRIMARY LEACHING | 58.22 | 98 | 13.33 |
| SECONDARY LEACHING | 65.07 | 0 | 0 |
| PROCESS TOTAL | 67.61 | 98 | 11.93 |

NOTE:
Secondary leaching does not use fresh acid, it utilizes the acid regenerated in the refining process.

It should be pointed out that when this ore is incorporated in the percolation pans, its recovery does not exceed 30%. Moreover, when it is treated by a conventional agitation leaching process, the separation of phases becomes critical and this process does not become technically feasible.

EXAMPLE 9

In this process, application of the process to the treatment of other oxidized sources of the Chuquicamata Division at pilot level is considered.

Using the same pilot plant already described above, the process was applied to the treatment of the following oxidized sources of the Division:

Mina Sur ore feed to percolation pans: Coming from the Mina Sur deposit and reduced to a grain size of (<3/8").

New Mina Sur spalls: Coming from pan leaching process. Grain size 25–30% (>⅜").

Old Mina Sur spalls: Coming from Mina Sur spall dumps. Grain size 20–25% (>⅜").

Chuqui Norte ore: Coming from Chuqui Norte deposit and reduced to a grain size of (>⅜").

El Abra ore: Coming from the "El Abra" deposit and reduced to a grain size of (<½") (mixture of 20% feldspathic ore).

Summaries of the principal operating conditions employed and the metallurgical results obtained are presented in Tables 7 and 8 below. These results demonstrate the technical feasibility of application of the process to any type of oxidized copper source.

For Tables 7 and 8 below, Mina Sur ores are represented by I; New Mina Sur spalls are represented by II; Old Mina Sur spalls are represented by III; Chuqui norte ores are represented by IV; and El Abra ores are represented by V.

TABLE 7

| OPERATING CONDITIONS IN PILOT EVALUATION | | | | | |
| --- | --- | --- | --- | --- | --- |
| ITEM | I | II | III | IV | V |
| Dose (kg/MT) | | | | | |
| $H_2SO_4$ | 60 | 40 | 40 | 40 | 40 |
| $H_2O$ | 50 | 0 | 50 | 60 | 40 |
| Rest time (days) | 1 | 1 | 1 | 1 | 1 |
| Classification mesh repulped product washing drum (mm) | 2 | 2 | 2 | 2 | 2 |
| Composition of initial ore in % | | | | | |
| Total copper: | 1.57 | 0.57 | 1.26 | 1.12 | 0.89 |
| Soluble copper: | 1.19 | 0.36 | 0.82 | 0.73 | 0.82 |
| Secondary leaching time, (>2 mm) fraction (days) | 30 | 30 | — | 30 | 34 |

TABLE 8

| PRINCIPAL METALLUGRICAL RESULTS, PILOT TESTS | | | | | |
| --- | --- | --- | --- | --- | --- |
| ITEM | I | II | III* | IV | V |
| Recovery of copper in primary leaching: | 61.70 | 47.40 | 73.80 | 46.20 | 56.60 |
| Recovery of copper in secondary leaching: | 18.80 | 23.40 | — | 43.80 | 26.90 |
| Total recovery of copper in the process: | 80.50 | 70.80 | 73.80 | 90.00 | 86.50 |

*Secondary leaching was not considered.

Accordingly to the provisions of the Patent Statutes, we have explained the principle, preferred construction and mode of operation of the invention and have illustrated and described what we now consider to represent its best embodiments. However, it should be understood, that within the scope of the appended claims, the invention may be practiced otherwise than as specifically illustrated and described.

What is claimed is:

1. A process for extracting copper from copper bearing ore, comprising:

substantially uniformly wetting a copper bearing ore with an aqueous solution which contains sulfuric acid in sufficient quantities and for a sufficient time to uniformly wet the ore and alter the surface characteristics of the ore by increasing its thickening and filtration properties, and to sulfatize a significant portion of the copper therein;

allowing the wetted ore to age for a time sufficient to further sulfatize the copper therein and form a substantially sulfatized copper ore;

repulping the aged sulfatized copper ore with an aqueous solution which contains water and optionally contains sulfuric acid for a sufficient time to extract a substantial portion of the sulfatized copper therefrom in a copper bearing solution;

classifying the sulfatized ore into coarse and fine fractions according to particle size distribution;

dewatering the fine fraction to obtain another copper bearing solution;

acid leaching the coarse fraction to obtain another copper bearing solution; and recovering copper from one or more of the copper bearing solutions.

2. A process according to claim 1, wherein the copper bearing ore has a typical grain size ranging between that resulting from crushing and that resulting from fine grinding.

3. A process according to claim 1, which further comprises selecting the amount of sulfuric acid to be between about 5 and 500 kg/MT and selecting the amount of water to be from 0 to about 250 kg/MT.

4. A process according to claim 3, wherein the amount of sulfuric acid is between about 15 and 60 kg/MT and the amount of water is between about 40 and 120 kg/MT.

5. A process according to claim 4, wherein the sulfuric acid is a concentrated $H_2SO_4$ solution and plant water, raffinate from a solvent extraction process, or discarded electrolyte obtained from a copper electrowinning process is used as one of the aqueous solutions.

6. A process for extracting copper from copper bearing ore, comprising:

substantially uniformly wetting a copper bearing ore with an aqueous solution which contains sulfuric acid in sufficient quantities and for a sufficient time to uniformly wet the ore and alter the surface characteristics of the ore by increasing its thickening and filtration properties, and to sulfatize a significant portion of the copper therein;

introducing into the copper bearing ore in the wetting stage an oxidizing agent in an amount sufficient to help oxidize copper sulfides;

allowing the wetted ore to age for a time sufficient to further sulfatize the copper therein and form a substantially sulfatized copper ore;

repulping the aged sulfatized copper ore with an aqueous solution which optionally contains sulfuric acid for a sufficient time to extract a substantial portion of the sulfatized copper therefrom in a copper bearing solution;

classifying the sulfatized ore into coarse and fine fractions according to particle size distribution;

dewatering the fine fraction to obtain another copper bearing solution;

acid leaching the coarse fraction to obtain another copper bearing solution; and recovering copper from one or more of the copper bearing solutions.

7. A process according to claim 1, wherein the wetting step takes place over a period of time between about 5 minutes and one year.

8. A process according to claim 1 wherein the repulping step has a residence time ranging from about 5 minutes to about 24 hours.

9. A process according to claim 1 wherein the repulping step has a residence time ranging of about 10 minutes or less.

10. A process according to claim 1, which further comprises recovering the copper by a solvent extraction-electrowinning process, and recycling raffinate from a solvent extraction process for use as a supply of water for the aqueous solutions.

11. A process for extracting copper from copper bearing ore, comprising:

classifying copper ore into coarse and fine fractions;

collecting the coarse and fine fractions;

substantially uniformly wetting the fine fraction with an aqueous solution which contains sulfuric acid in sufficient quantities and for a sufficient time to uniformly wet the ore and alter the surface characteristics of the ore by increasing its thickening and filtration properties and to sulfatize a significant portion of the copper therein;

allowing the wetted fine fraction to age for a time sufficient to further sulfatize the copper therein and form a substantially sulfatized fine fraction;

repulping the aged sulfatized fine fraction with an aqueous solution which optionally contains sulfuric acid for a sufficient time to extract a substantial portion of the sulfatized copper therefrom in a copper bearing solution;

dewatering the fine fraction to obtain another copper bearing solution;

substantially uniformly wetting the coarse fraction with sulfuric acid and an aqueous solution in sufficient quantities to sulfatize a significant portion of the copper therein;

allowing the wetted coarse fraction to age for a time sufficient to sulfatize the copper therein and form a substantially sulfatized coarse fraction;

heap leaching the coarse ore fraction with an aqueous solution which contains sulfuric acid in sufficient quantities and for a sufficient time to extract the copper into another copper bearing solution; and recovering copper from one or more of the copper bearing solutions.

12. A process according to claim 11, wherein the heap leaching of the coarse fraction is performed with a concentrated sulfuric acid solution at a flow rate of between about 2 and 500 liters/hour per square meter of heap irrigable surface.

13. A process according to claim 12, wherein the copper bearing solution from the heap leaching of the coarse fraction is recycled to the repulping step for use as the aqueous solution.

14. A process for extracting copper from copper bearing ore, comprising:

substantially uniformly wetting a copper bearing ore with sulfuric acid and an aqueous solution in sufficient quantities and for a sufficient time to uniformly wet the ore and alter the surface characteristics of the ore by increasing its thickening and filtration properties, and to sulfatize a significant portion of the copper therein;

allowing the wetted ore to age for a time sufficient to further sulfatize the copper therein and form a substantially sulfatized copper ore;

repulping the aged sulfatized ore with an aqueous solution which optionally contains sulfuric acid for a sufficient time to extract a portion of the sulfatized copper therefrom in a copper bearing solution;

classifying the sulfatized ore into coarse and fine fractions, wherein the coarse fraction has a particle size of 2 mm or greater and the fine fraction has a particle size of less than 2 mm;

dewatering the fine fraction to obtain a copper bearing solution;

acid leaching the coarse fraction to obtain another copper bearing solution; and recovering copper from one or more of the copper bearing solutions.

15. A process according to claim 11, wherein the copper bearing solution obtained from the heap leaching step is combined with the copper bearing solution obtained from the dewatering step before recovering copper therefrom.

16. A process according to claim 11 which further comprises classifying the ore using a screen having apertures ranging from 200 Tyler sieve mesh to about 25

17. A process according to claim 11 which further comprises classifying the ore using a screen having apertures ranging from about 2 mm to about 3 mm.

18. A process according to claim 1 wherein the dewatering step comprises:

thickening the fine fraction; and washing the thickened fine fraction to extract the sulfatized copper therefrom in a solution.

19. A process according to claim 18, which further comprises adding a flocculent to the fine fraction prior to thickening in an amount of between about 5 and 500 grams per ton.

20. A process according to claim 18, which further comprises adding a flocculent to the fine fraction prior to thickening in an amount of between about 40 and 150 grams per ton.

21. A process according to claim 18, which further comprises:

mixing the copper bearing solution from the head leaching of the coarse fraction with the solution coming from the fine fraction washing step to form a mixture; and recycling the mixture to a solvent extraction-electrowinning process.

22. A process according to claim 1 wherein the dewatering step comprises:

thickening the fine fraction;

filtering the thickened fine fraction; and washing the thickened, filtered fine fraction to extract the sulfatized copper therefrom.

23. A process according to claim 1 wherein the dewatering step comprises directly filtering the fine fraction and washing the filtered fine fraction to extract the sulfatized copper therefrom.

24. A process according to claim 1 wherein at least a portion of the copper bearing solution resulting from the leaching of the coarse fraction is recycled for use as the aqueous solution in the repulping step.

25. A process according to claim 11 wherein at least a portion of the solution resulting from the heap leaching of the coarse fraction is recycled for use as the aqueous solution in the repulping step.

* * * * *